(12) United States Patent
Takada et al.

(10) Patent No.: US 6,729,892 B2
(45) Date of Patent: May 4, 2004

(54) CARD CONNECTOR

(75) Inventors: Toshihumi Takada, Hokkaido (JP); Masaaki Oya, Yokohama (JP); Minoru Igarashi, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/832,190

(22) Filed: Apr. 11, 2001

(65) Prior Publication Data

US 2001/0055896 A1 Dec. 27, 2001

(30) Foreign Application Priority Data

Apr. 12, 2000 (JP) .................................... 2000-111321
Oct. 25, 2000 (JP) .................................... 2000-326019

(51) Int. Cl.$^7$ .............................................. H01R 13/62
(52) U.S. Cl. ....................... 439/159; 439/630; 439/328
(58) Field of Search ................................ 439/159, 160, 439/310, 333, 395, 337, 328, 630; 361/798, 754

(56) References Cited

U.S. PATENT DOCUMENTS

| | | | | |
|---|---|---|---|---|
| 4,810,200 A | | 3/1989 | Sakamoto | 429/155 |
| 4,952,161 A | | 8/1990 | Komatsu | 439/155 |
| 5,033,972 A | | 7/1991 | Komatsu et al. | |
| 5,051,101 A | * | 9/1991 | Komatsu | |
| 5,145,389 A | * | 9/1992 | Okubo | 439/159 |
| 5,179,505 A | | 1/1993 | Matsuo | 361/395 |
| 5,197,894 A | * | 3/1993 | Koike | 439/159 |
| 5,286,207 A | | 2/1994 | McHugh | |
| 5,492,480 A | | 2/1996 | Fusselman et al. | |
| 5,492,481 A | | 2/1996 | Lewis | |
| 5,533,906 A | * | 7/1996 | Abe | 439/459 |
| 5,597,316 A | | 1/1997 | David et al. | 439/159 |

(List continued on next page.)

FOREIGN PATENT DOCUMENTS

| | | |
|---|---|---|
| JP | 3-46969 | 4/1991 |
| JP | 6-139415 | 5/1994 |
| JP | 7-192102 | 7/1995 |
| JP | 2000-251024 | 9/2000 |
| JP | 2000-251025 | 9/2000 |
| JP | 2000-277207 | 10/2000 |

OTHER PUBLICATIONS

U.S. patent application Ser. No. 09/914,322, S. Sato, filed Aug. 27,2001.
U.S. patent application Ser. No. 09/978,660, 09/978,661, S. Sato, filed Oct. 18, 2001.
U.S. patent application Ser. No. 10/067,404, M. Ooya et al. filed Feb. 2, 2002.
U.S. patent application Ser. No. 10/090,153, T. Ito et al., filed Mar. 5, 2002.
U.S. patent application Ser. No. 10/102,826, S. Sato et al. filed Mar. 22, 2002.
U.S. patent application Ser. No. 10/102,928, K. Abe, Mar. 22, 2002.

Primary Examiner—P. Austin Bradley
Assistant Examiner—Edwin A. Leon
(74) Attorney, Agent, or Firm—Finnegan, Henderson, Farabow, Garrett & Dunner, LLP

(57) ABSTRACT

A card connector that reliably holds an inserted card with a compact mechanism to prevent the falling of the card due to unexpected external forces. The card 10 is formed with the recess 18 to receive the locking portion. The elastic locking piece 50 is mounted to the eject member 41 that slides together with the card 10 as the card is inserted or retracted. The locking piece guide means 50b, 61 converts the motion of the eject member 41 in the card insertion/retraction direction into the motion of the locking portion 50c of the elastic locking piece 50 toward or away from the card so that the locking portion 50c is engaged in the recess 18 during the card insertion and, during the card ejection, is disengaged from the recess 18.

6 Claims, 39 Drawing Sheets

U.S. PATENT DOCUMENTS

| | | | |
|---|---|---|---|
| 5,640,307 A | 6/1997 | Bleier et al. | 361/740 |
| 5,648,651 A | 7/1997 | Inoue | |
| 5,655,918 A * | 8/1997 | Soh | 439/159 |
| 5,674,080 A | 10/1997 | Takemura | |
| 5,695,351 A * | 12/1997 | Kimura et al. | 439/159 |
| 5,703,346 A | 12/1997 | Bricaud et al. | 235/44.1 |
| 5,725,385 A | 3/1998 | Takano et al. | |
| 5,740,012 A | 4/1998 | Choi | |
| 5,871,365 A | 2/1999 | Kajiura | 439/156 |
| 5,890,920 A * | 4/1999 | David et al. | 439/159 |
| 5,899,763 A * | 5/1999 | Kajiura | 439/159 |
| 5,923,541 A * | 7/1999 | Yasumi | 361/798 |
| 5,967,810 A * | 10/1999 | Spickler et al. | 439/159 |
| 6,065,984 A * | 5/2000 | Tung | 439/159 |
| 6,083,018 A | 7/2000 | Hara et al. | |
| 6,095,834 A * | 8/2000 | Lai et al. | 439/159 |
| 6,106,313 A * | 8/2000 | Chen | 439/159 |
| 6,120,309 A * | 9/2000 | Hara | 439/159 |
| 6,139,340 A * | 10/2000 | Niitsu | 439/159 |
| 6,152,748 A | 11/2000 | Sato et al. | |
| 6,159,027 A * | 12/2000 | Kuo | 439/159 |
| 6,162,075 A * | 12/2000 | Hara et al. | 439/159 |
| 6,174,197 B1 | 1/2001 | Hirata et al. | |
| 6,200,148 B1 * | 3/2001 | Yu | 439/159 |
| 6,210,187 B1 * | 4/2001 | Tung | 439/159 |
| 6,227,879 B1 | 5/2001 | Dong | |
| 6,231,360 B1 | 5/2001 | Horie | |
| 6,234,813 B1 * | 5/2001 | Hanyu | 439/159 |
| 6,270,365 B1 * | 8/2001 | Nishioka | 439/159 |
| 6,273,737 B1 | 8/2001 | Furusho et al. | |
| 6,290,136 B1 | 9/2001 | Koseki et al. | |
| 6,299,465 B1 | 10/2001 | Hirata | |
| 6,302,715 B1 | 10/2001 | Sato et al. | |
| 6,319,029 B2 | 11/2001 | Nishioka | |
| 6,332,790 B1 | 12/2001 | Ishikawa et al. | |
| 6,390,836 B1 | 5/2002 | Motegi et al. | |
| 6,394,827 B2 | 5/2002 | Nogami | |
| 6,398,567 B1 * | 6/2002 | Nishimura | 439/159 |
| 6,398,827 B1 | 6/2002 | Ota et al. | |

* cited by examiner

FIG.2A  FIG.2B

CARD CONNECTOR

This application is based on Patent Application Nos. 2000-111321 filed Apr. 12, 2000 and 2000-326019 filed Oct. 25, 2000 in Japan, the content of which is incorporated hereinto by reference.

BACKGROUND OF THE INVENTION

1. Field of the Invention

The present invention relates to a card connector mounted on electronic devices, such as cellular phones, telephones, PDAs (personal digital assistants), portable audio devices and cameras, and more specifically to a connector with a compact structure for reliably preventing an IC card from falling out.

2. Description of the Related Art

In electronic devices such as cellular phones, telephones, PDAs and cameras, a variety of functions are added by inserting an IC card with a built-in CPU or memory IC, such as a SIM (subscriber identity module) card, an MMC (multimedia card), an SD (super density) card, a Memory Stick (tradename) and a Smart Media (tradename) card.

In a connector structure for removably accommodating such an IC card, a plurality of contact terminals connected with a signal processing circuit and a power supply circuit of the electronic device are provided in a connector housing so that they can make contact with a plurality of contact pads formed on the front or back surface of the inserted IC card to electrically connect the IC card to the electronic device on which the connector is mounted.

Many such card connectors have an eject mechanism to remove the inserted card from the connector.

To prevent the card from flying out of the connector during the eject operation or to prevent the card from falling out of the connector due to unexpected external forces during the card insert operation, some card connectors with the eject mechanism of this kind have an appropriate elastic brake piece secured to a predetermined location of the connector housing to apply a contact pressure to the card and thereby produce a frictional force acting in a direction opposite the direction in which the card tends to fall out.

Because the card needs to be taken out of the connector, however, the contact pressure of the brake piece cannot be set unnecessarily large. Hence, with the conventional card fall prevention mechanism based on the contact pressure of the brake piece, it is not possible to reliably prevent the card from falling due to the causes described above or impacts.

In recent years, there are growing demands for reduced size, lower height and reduced weight of the card connector itself, which in turn calls for a compact and lightweight construction for the card fall prevention mechanism.

SUMMARY OF THE INVENTION

The present invention has been accomplished under these circumstances and provides a card connector capable of reliably holding an inserted card with a compact mechanism and thereby preventing it from falling out.

Viewed from one aspect the present invention provides a card connector for accepting a card, which has a recess in its side surface and a plurality of contact pads on its bottom surface, and holding it in a connector housing so that the contact pads are in contact with contact terminals arranged in the connector housing, the card connector comprising: an eject mechanism having an eject member, the eject member being adapted to move in a card insertion direction as the card is inserted into the connector and to move in a card eject direction in response to a card eject operation to eject the card; an elastic locking piece having a locking portion to engage in the recess of the card and a stationary portion fixed in the eject member, the elastic locking piece being urged toward the card so that when the elastic locking piece is set free to move elastically by the urging force, the locking portion engages in the recess of the card; and a locking piece guide means for guiding the elastic locking piece to elastically deform it to move the locking portion away from the recess during the card eject operation and, during the card insertion operation, releasing the elastic locking piece from the elastic deformation to engage the locking portion in the recess of the card.

In this invention, the card is formed with the recess for receiving the locking portion, and the elastic locking piece is mounted to the eject member that slides together with the card as the card is inserted or retracted. The elastic locking piece is urged by its own elasticity in a direction that engages the card so that when the elastic locking piece is set free, the locking portion engages in the recess of the card. The motion of the eject member in the card insertion/retraction direction is converted by the locking piece guide means into the motion of the locking portion of the elastic locking piece toward or away from the card so that the locking portion is engaged in the recess during the card insertion and, during the card ejection, is disengaged from the recess.

Because in this invention the locking portion of the elastic locking piece is forcibly moved toward or away from the card not by the movement of the card itself but by the movement of the eject member that behaves in the similar manner to the card, the locking portion of the elastic locking piece can employ a locking structure, such as one shaped like a hook, that can completely block the movement of the card in the retraction direction. This prevents the card from falling out inadvertently or due to unexpected external forces or impacts, thus reliably holding the card at all times during the card insertion.

Further, in the card connector of this invention, because the elastic locking piece is urged in a direction that engages the card so that the elastic locking piece, when set free, causes the locking portion to engage in the recess of the card, the insertion of a second card without the recess makes the locking portion of the elastic locking piece work as a braking piece that presses against the wall surface of the second card to apply to the card a braking force that acts in a direction opposing the card retraction.

Hence, the single card connector of this invention can accept two kinds of cards, one formed with the recess and one without it.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
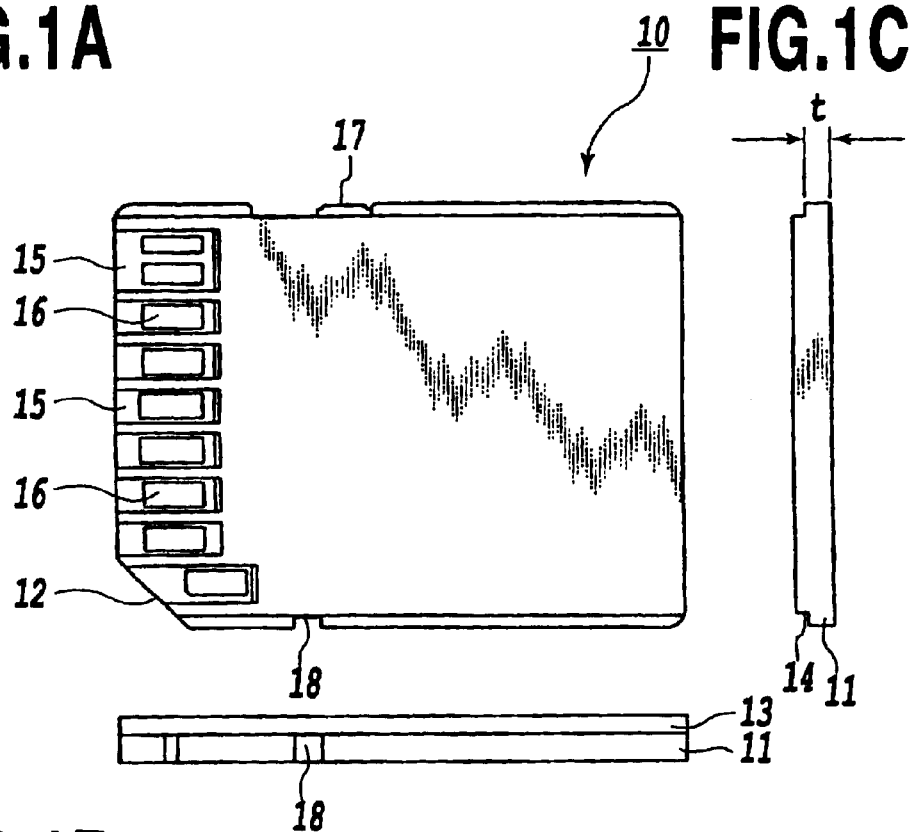
FIGS. 1A, 1B and 1C are a bottom view, a side view and a front view of a two-stage thickness card.

Now, embodiments of this invention will be described in detail by referring to the accompanying drawings.

First, let us explain about two kinds of cards that can be inserted into the embodiments of the card connectors.

FIGS. 1A, 1B and 1C are a bottom view, a side view and a front view of an SD card as an example of the two-stage thickness card 10.

This two-stage thickness card 10 has an upper body portion 11 with a thickness t. The upper body portion 11 has a triangular notched portion 12 at its left front end to prevent an erroneous insertion. At the back side of the upper body portion 11 is formed a lower body portion 13 slightly narrower than the upper body portion 11. That is, the card 10 has a two-stage structure in which a stepped portion 14 is formed along the card sides by the bottom surface of the upper body portion 11 and the bottom surface of the lower body portion 13. The lower body portion 13 has near its front end a plurality of recessed portions 15, on the bottom surfaces of which are arranged a plurality of contact pads 16 connected to an IC circuit in the card. The card 10 has a write protect switch 17 on one side thereof.

The two-stage thickness card 10 has a notch or recess 18 at the other side of the upper body portion 11 to lock the card.

Figure 2:
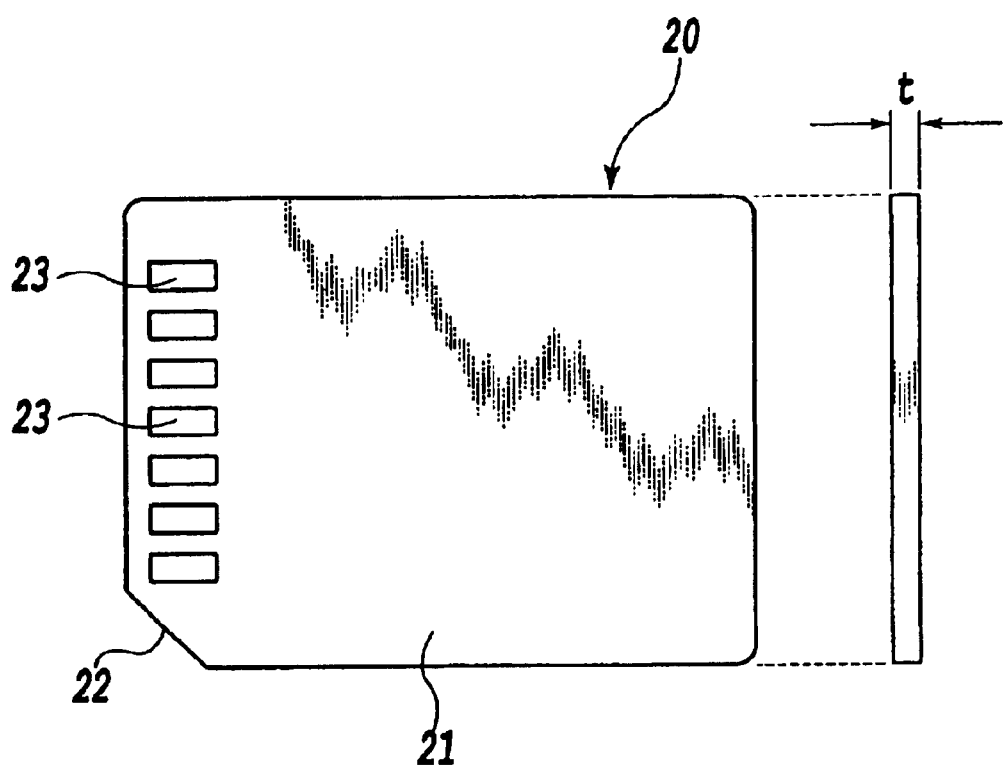
FIGS. 2A and 2B are a bottom view and a front view of a one-stage thickness card.

FIG. 2 show two views of an MMC card as an example of one-stage thickness card 20.

In FIG. 2, the one-stage thickness card 20 has a card body 21 almost equal in thickness t to the upper body portion 11 of the two-stage thickness card 10. The one-stage thickness card 20 has a notched portion 22 at the left front end to prevent an erroneous insertion. A plurality of contact pads 23 are arranged on the bottom surface of the one-stage thickness card 20 near the front end.

The shape and size in plan view of the one-stage thickness card 20 and its contact pad positions are almost similar to those of the two-stage thickness card 10 of FIG. 1.

First Embodiment

Next, the first embodiment of the card connector of this invention will be described by referring to FIGS. 3 to 15.

Figure 3:
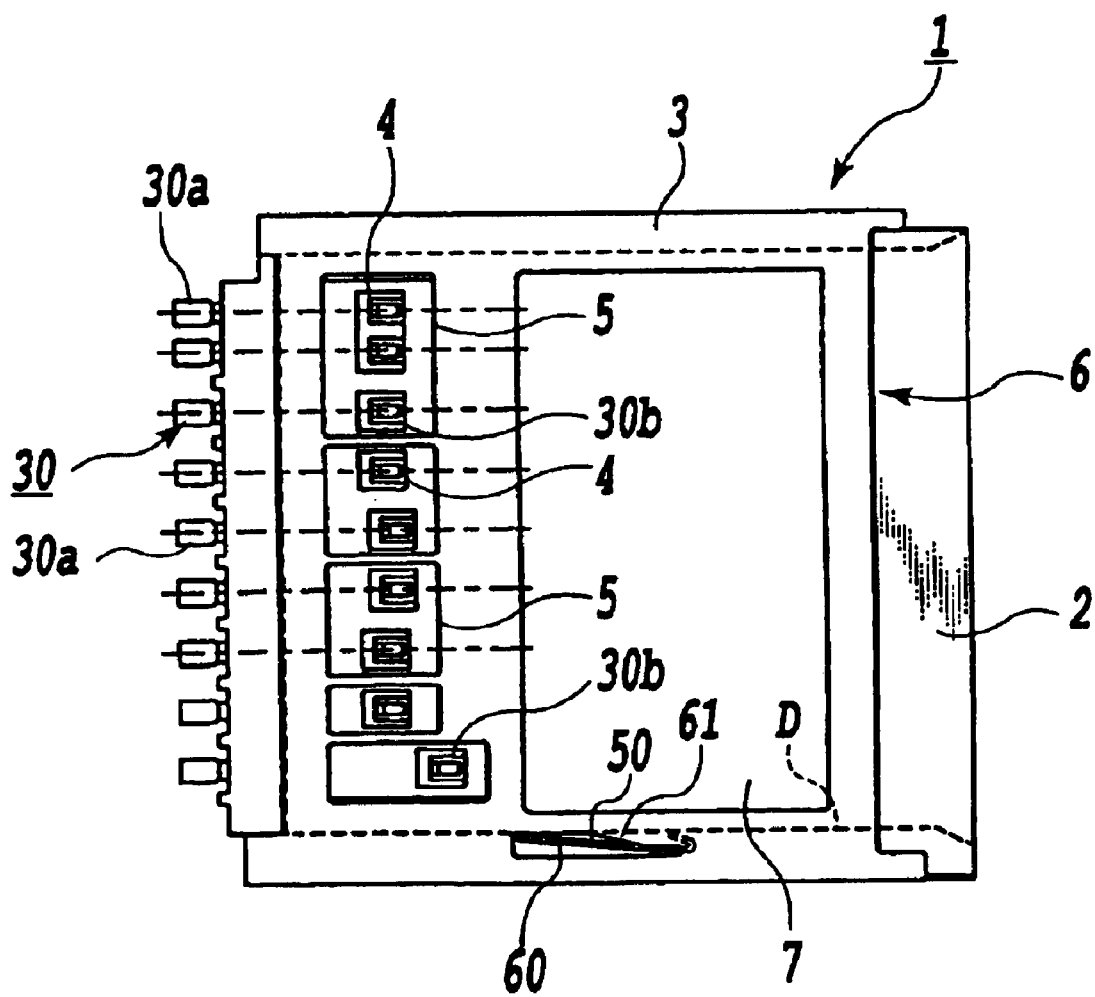
FIG. 3 is a plan view of the card connector as a first embodiment of the invention.
Figure 4:
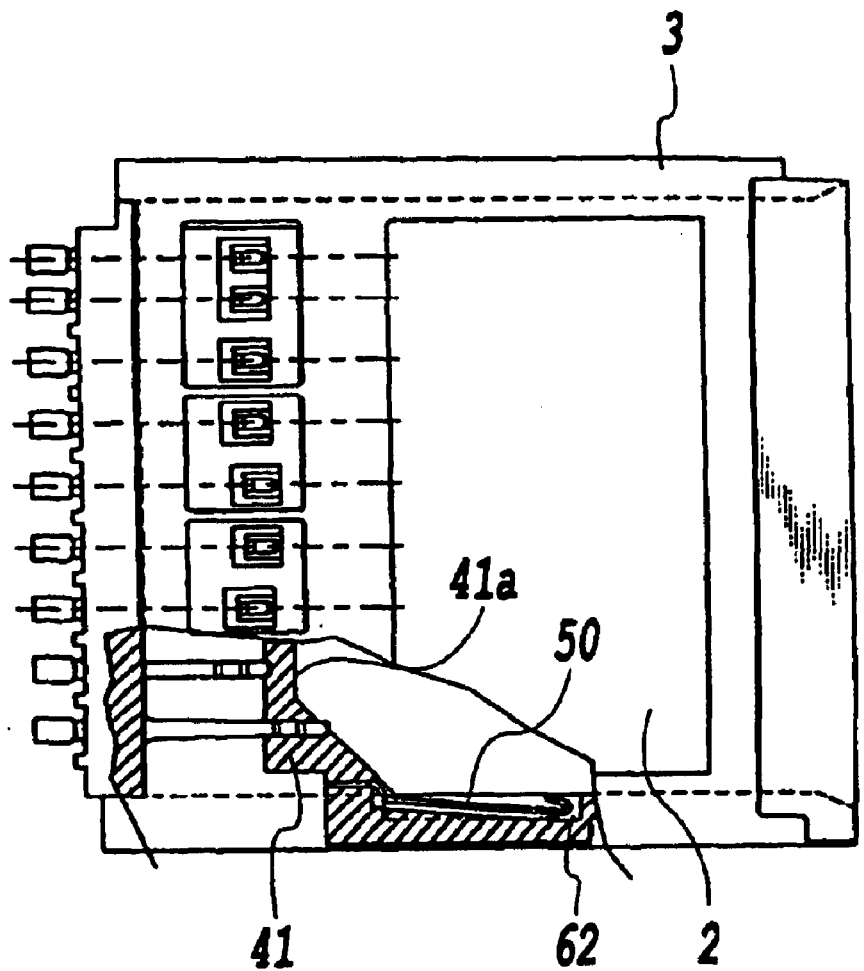
FIG. 4 is a partially cutaway plan view of the card connector as the first embodiment of the invention.
Figure 5:
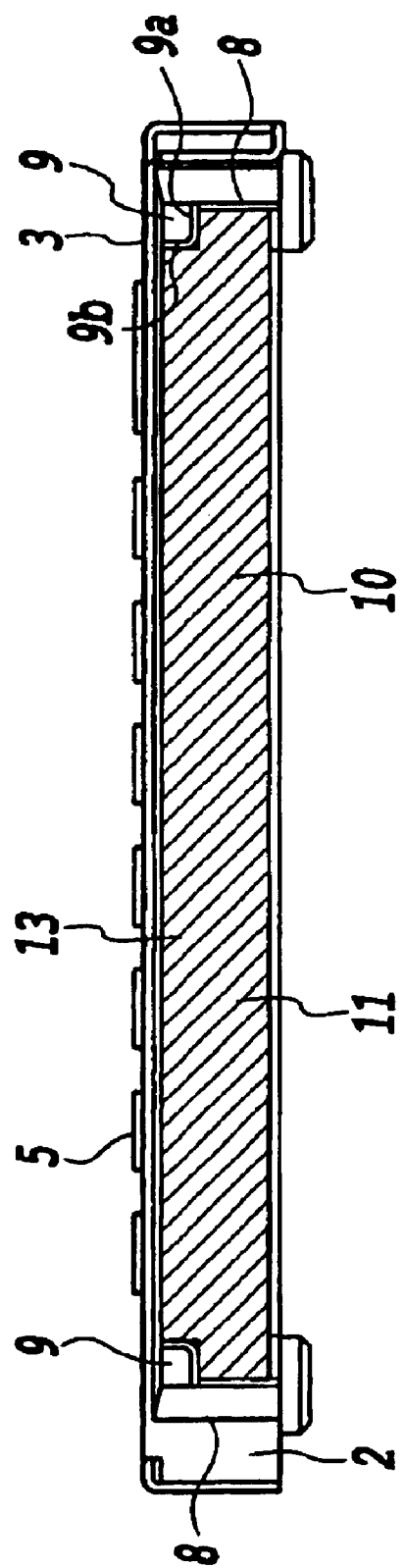
FIG. 5 is a front view of the card connector as the first embodiment of the invention.

FIG. 3 is a plan view showing an external structure of the card connector 1, FIG. 4 is a partially cutaway plan view of the same, and FIG. 5 is a front view showing the card connector loaded with the two-stage thickness card 10.

The card connector 1 is installed in electronic devices such as cellular phones, PDAs, portable audio devices and cameras.

The card connector 1 has a connector housing 2 molded from an insulating material such as resin and a cover 3 (fabricated from a metal in this case) that is placed over the connector housing 2. The connector housing 2 has an top plate, a base plate, side plates and a rear plate.

The top plate of the connector housing 2 is formed with a plurality of escape holes 4 through which the front ends of elastically deformed contact terminals 30 can escape when the two-stage thickness card 10 or one-stage thickness card 20 is inserted. The metal cover 3 is also formed with similar escape holes 5.

The contact terminals 30 formed as cantilevered contact leaf spring are secured to the top plate of the connector housing 2. The contact terminals 30 each have a terminal portion 30a soldered to an associated contact pad formed on a printed circuit board in the electronic device, a stationary portion (not shown) secured to the top plate of the connector housing 2, and a contact portion 30b protruding down so that it can be elastically deformed to make contact with an associated contact pad of the card 10 or 20.

The connector housing 2 has at its front side or near side a card slot 6, a common insertion opening through which to insert the two kinds of cards 10, 20 into the connector.

In this case, because the contact terminals 30 are provided on the top plate of the connector housing 2, both the two-stage thickness card 10 and the one-stage thickness card 20 are inserted into the connector 1 with the surface formed with the contact pads 16, 23 facing up (see FIG. 5).

On the far side beyond the card slot 6 a card accommodating portion 7 is formed to receive the two-stage thickness card 10 and one-stage thickness card 20.

In the card accommodating portion 7, as shown in FIG. 5, guide grooves 8 are formed on the left and right sides to support and guide the upper body portion 11 of the two-stage thickness card 10, or the one-stage thickness card 20.

Further, at both the upper corners of the card accommodating portion 7 there are formed stepped portions 9 whose bottom walls 9a restrict the vertical position of the two-stage thickness card 10 and the one-stage thickness card 20 and hold them down.

Side walls 9b of the stepped portions 9 guide the side surfaces of the lower body portion 13 of the two-stage thickness card 10. Because the two-stage thickness card 10 is guided by the guide grooves 8, it is of course possible to set the dimensions of the stepped portions 9 so that the lower body portion 13 of the two-stage thickness card 10 is accommodated in a space between the stepped portions 9.

In the one-stage thickness card 20, as described above, the contact pads 23 are disposed on the bottom surface of the card body 21. In the two-stage thickness card 10 the contact pads 16 are situated on the bottom surface of the upper body portion 11. With the connector construction described above, the guide grooves 8 support and guide the upper body portion 11 of the two-stage thickness card 10, or the one-stage thickness card 20. Hence, when either of these cards 10, 20 is inserted, the distances between the contact pads 16, 23 and the contact terminals 30 of the connector 1 are equal, giving the contact terminals the same amount of elastic deformation for both of the cards 10, 20 and thereby producing stable contact reliability for both cards 10, 20.

The card connector 1 has an eject mechanism 40 which, when the inserted card 10 or 20 is pushed slightly toward the far side of the housing, ejects the inserted card 10 or 20.

FIG. 4, a partially cutaway plan view, shows an eject member 41 of the eject mechanism 40. The eject member 41 has a card abutment portion 41a that engages the notched portion 12 and the front end of the card 10 or 20.

Figure 6:
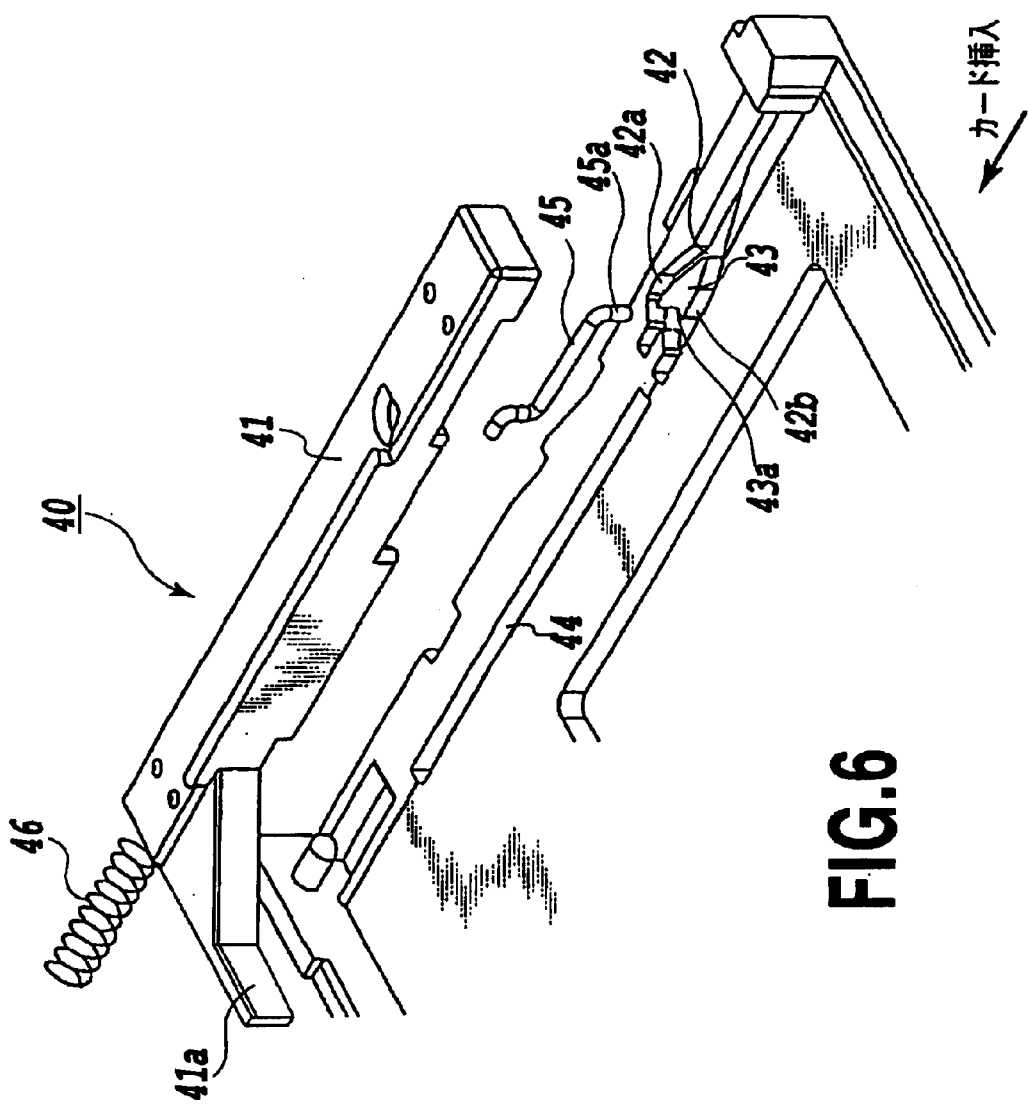
FIG. 6 is a schematic view showing an eject mechanism of the card connector of the invention.

The eject member 41 performs an eject operation by the eject mechanism 40 which is shown disassembled in FIG. 6. The eject mechanism of FIG. 6 are laterally reversed from that shown in FIG. 4.

The eject mechanism 40 has a lever guide groove 42, a heart cam 43 and a guide groove 44, all formed in the base plate of the connector housing 2, an eject member 41, a cam lever 45 supported by the eject member 41 to move through the lever guide groove 42, and a coil spring 46 disposed between the housing base plate and the eject member 41.

In this eject mechanism 40, when a card is inserted into the connector 1, the eject member 41 is pushed by the card to move toward the far side of the connector. At this time, a free end 45a of the cam lever 45 moves along a lever guide groove 42a1 until it is locked by a locking portion 43a of the heart cam 43. As a result, the card is held immovable in the connector 1, with the contact terminals 30 of the connector 1 engaging the contact pads 23, 16 of the card 10, 20.

When the card is to be ejected, the inserted card is pushed slightly toward the far side. As a result, the free end 45a of the cam lever 45 is unlocked from the locking portion 43a of the heart cam 43 and is moved toward the front of the connector along a lever guide groove 42b by the recovery force of the coil spring 46. Hence, the card is pushed back and ejected by the card abutment portion 41a of the eject member 41 driven by the recovery force of the coil spring 46.

In this way, the eject member 41 exhibits the same motion as the card when the card is inserted or removed.

Next, the card locking mechanism (card fall prevention mechanism), an essential part of this invention, will be described.

Figure 7:
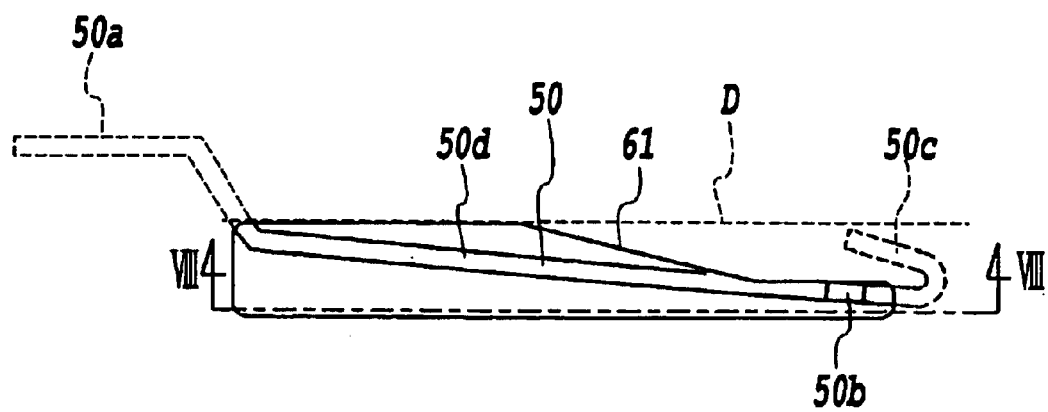
FIG. 7 is a partially enlarged plan view of FIG. 3.
Figure 8:
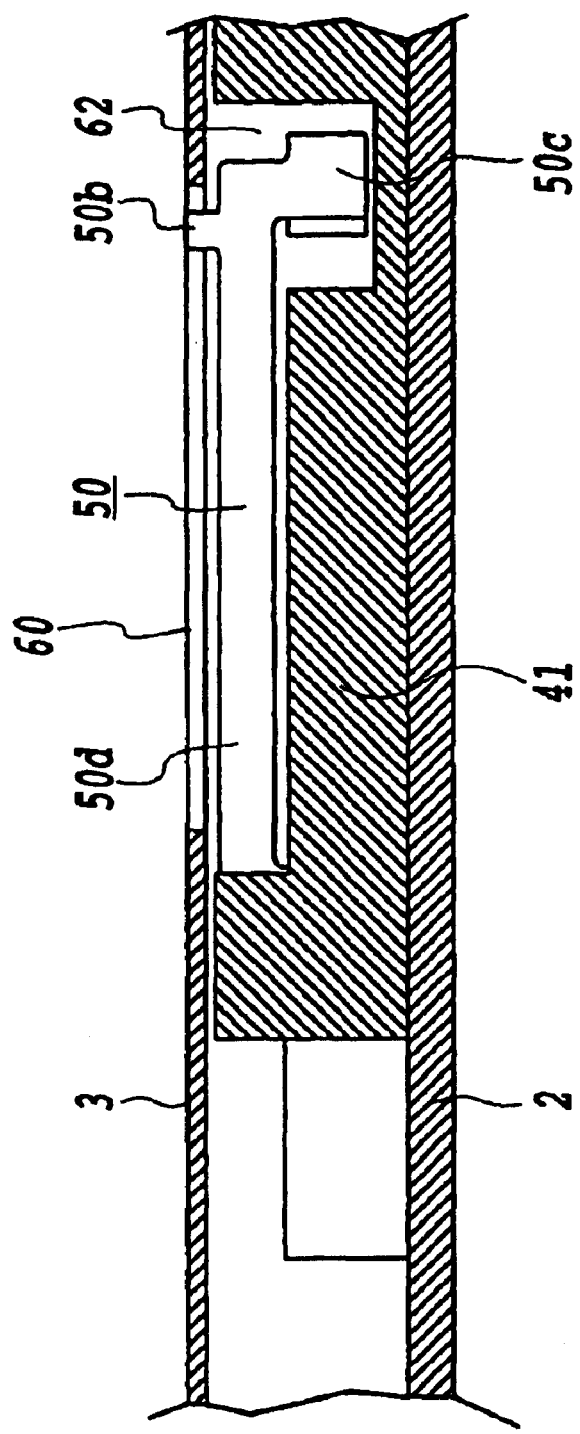
FIG. 8 is a cross section taken along the line VIII—VIII of FIG. 7.

As shown in FIG. 3 and FIG. 4, the eject member 41 has secured thereto an elastic locking piece 50 which fits in the recess 18 formed in the two-stage thickness card 10 to lock the card 10 immovable. The detailed shape of the elastic locking piece 50 is shown in FIG. 7 and FIG. 8. FIG. 7 is an enlarged top view showing an area in FIG. 3 where the elastic locking piece 50 is arranged. FIG. 8 is a cross section taken along the line VIII—VIII of FIG. 7.

As shown in these figures, the elastic locking piece 50 is formed of an elastically deformable material such as metal or resin and has a stationary portion 50a secured to the eject member 41, a protruding portion 50b projecting upwardly, a locking portion 50c shaped like a hook and adapted to fit into the recess 18 of the two-stage thickness card 10, and a spring portion 50d.

The eject member 41, as shown in FIG. 4 and FIG. 8, has a space 62 to accommodate the locking portion 50c and the spring portion 50d of the elastic locking piece 50.

The elastic locking piece 50 is urged toward the card 10 so that the locking portion 50c, when elastically recovered, fits into the recess 18 of the card 10.

The metal cover 3 is formed with a guide hole 60 having a tapered guide surface (cam surface) 61 that guides the protruding portion 50b of the elastic locking piece 50 as the eject member 41 moves. The guide hole 60 functions as a guide means for the elastic locking piece 50 when inserting or ejecting the two-stage thickness card 10. When the one-stage thickness card 20 is inserted, the guide hole 60 functions as a space for freely moving the protruding portion 50b of the locking piece 50.

A locking piece guide means made up of the protruding portion 50b of the elastic locking piece 50 and the guide surface 61 of the guide hole 60 converts the motion of the eject member 41 in the card insertion/retraction direction into the motion of the locking portion 50c of the elastic locking piece 50 toward and away from the card in such a manner that when the card 10 is inserted, the locking portion 50c is engaged in the recess 18 of the card 10 and when the card 10 is ejected, the locking portion 50c is disengaged from the recess 18.

In the connector structure described above, when the card is not inserted, the elastic locking piece 50 is disposed at a position shown in FIG. 3 or FIG. 7 according to the standby position of the eject member 41. At this position, because the protruding portion 50b of the elastic locking piece 50 is restricted by the guide surface 61 of the guide hole 60 formed in the metal cover 3, the elastic locking piece 50 is deformed outwardly keeping its locking portion 50c at a standby position outside a plane (dashed line D) of the side wall surface of the upper body portion 11 of the two-stage thickness card 10.

Figure 9:
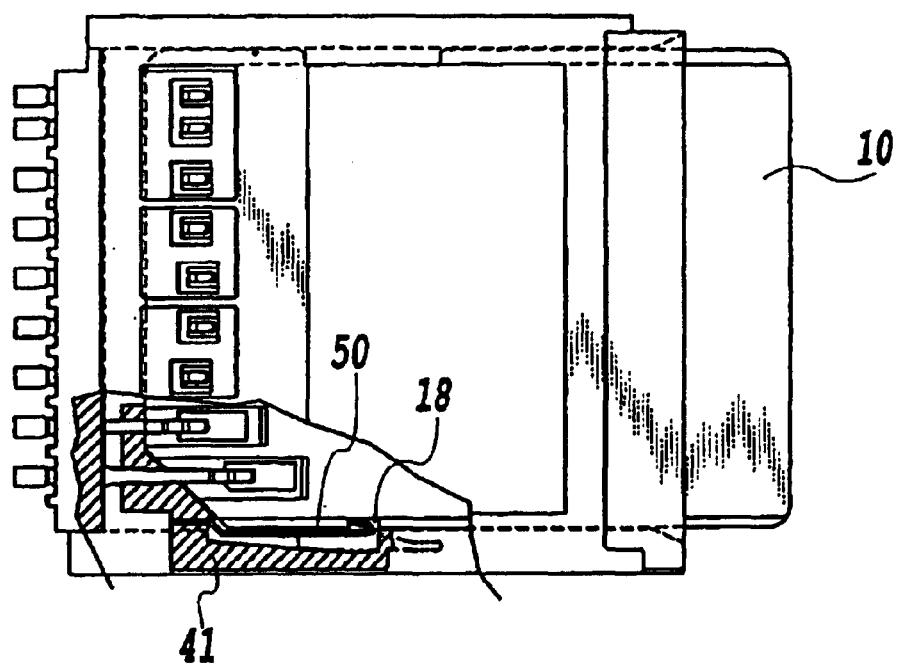
FIG. 9 is a partially cutaway plan view showing a state of the card connector of the first embodiment of the invention when a two-stage thickness card is inserted.
Figure 10:
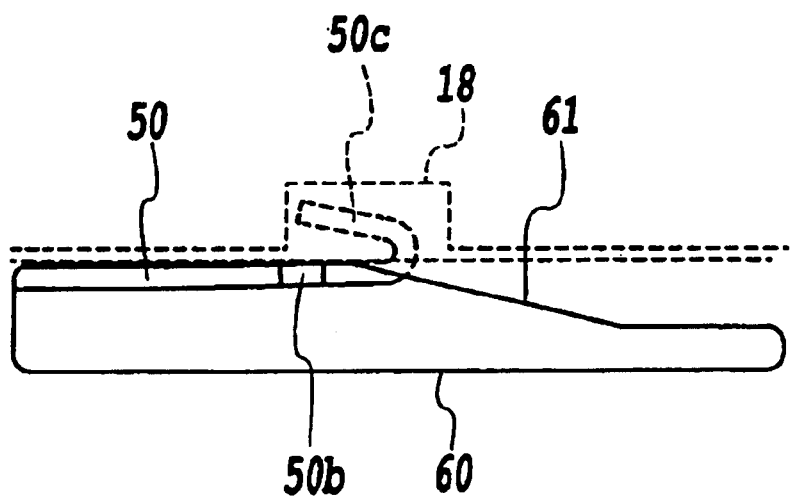
FIG. 10 is a partially enlarged plan view showing the state of the card connector of the first embodiment when the two-stage thickness card is inserted.

FIG. 9 and FIG. 10 show a state of the elastic locking piece 50 when the two-stage thickness card 10 is fully inserted. When the two-stage thickness card 10 is inserted, the eject member 41 is pushed by the front end of the card 10 toward the far side of the connector 1. At the same time, the elastic locking piece 50 is also moved toward the far side of the connector 1. As a result of this motion, the protruding portion 50b of the elastic locking piece 50 moves along the guide surface 61 of the guide hole 60 by the elastic recovery force, causing the locking portion 50c to move toward the side wall surface of the card 10 until it fits into the recess 18 of the card 10, locking it, as shown in FIG. 9 and FIG. 10.

In this locked state, the hook-shaped locking portion 50c engages in the recess 18 of the card 10 and totally blocks the movement of the card 10 in the retraction direction by the end of the locking portion 50c, thus preventing the card 10 from falling out inadvertently or due to external force.

Figure 11:
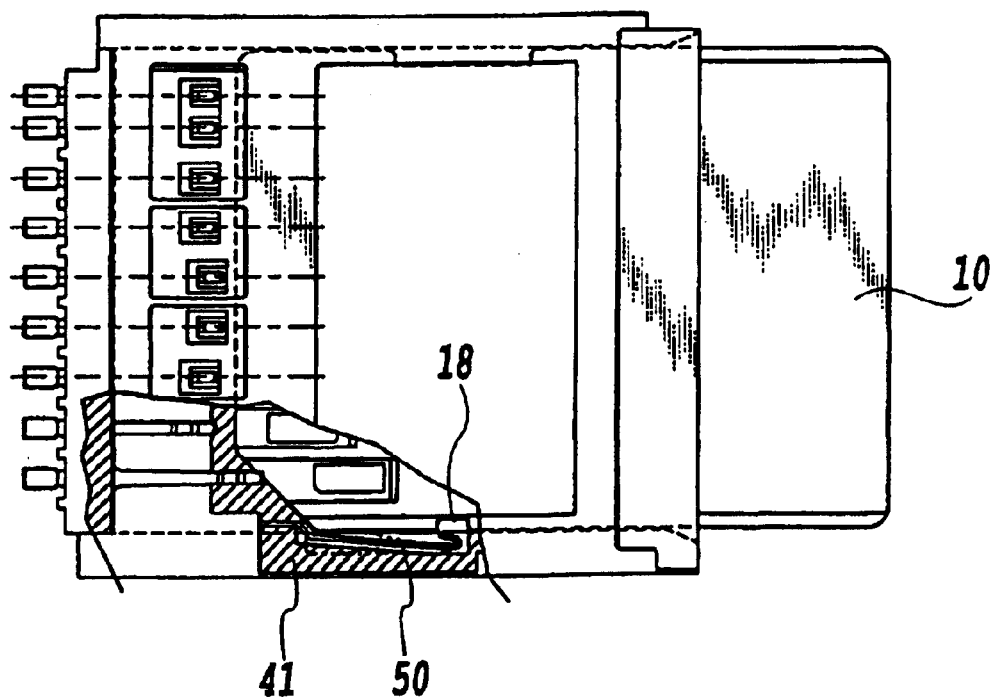
FIG. 11 is a partially cutaway plan view showing a state of the card connector of the first embodiment when the two-stage card is ejected.
Figure 12:
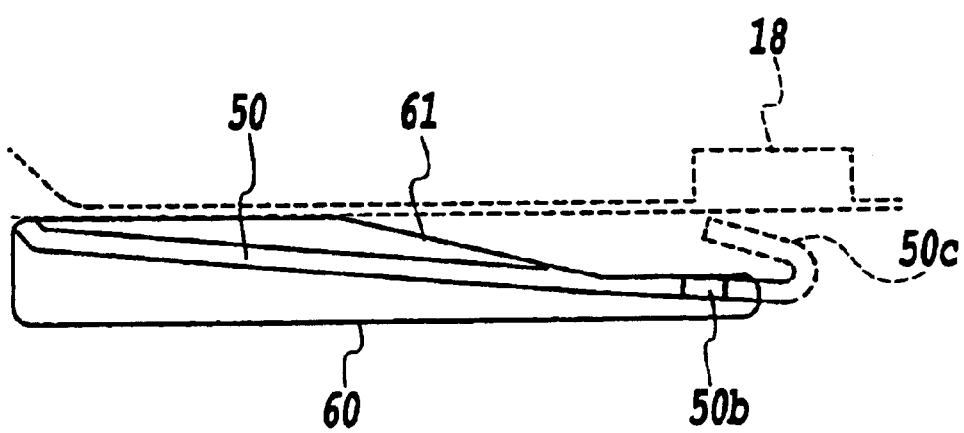
FIG. 12 is a partially enlarged plan view showing the state of the card connector of the first embodiment when the two-stage thickness card is ejected.

FIG. 11 and FIG. 12 show a state of the elastic locking piece 50 when the two-stage thickness card 10 is ejected.

As described above, when an eject operation of pushing the inserted card 10 further to the far side is carried out, the eject mechanism 40 is unlocked, allowing the eject member 41 to be moved forward by the recovery force of the coil spring 46. The movement of the eject member 41 causes the card 10 and the elastic locking piece 50 to move forwardly of the connector. At this time, the protruding portion 50b of the elastic locking piece 50 slides along the guide surface 61 of the guide hole 60 in a direction reverse to that in which it was moved when the card was inserted. Hence, the locking portion 50c of the elastic locking piece 50 moves away from the side wall surface of the card 10 until it stops at a position where it is out of contact with the side wall surface of the card 10. As a result, the card 10 is unlocked, free from any contact pressure of the elastic locking piece 50, and can be discharged.

Figure 13:
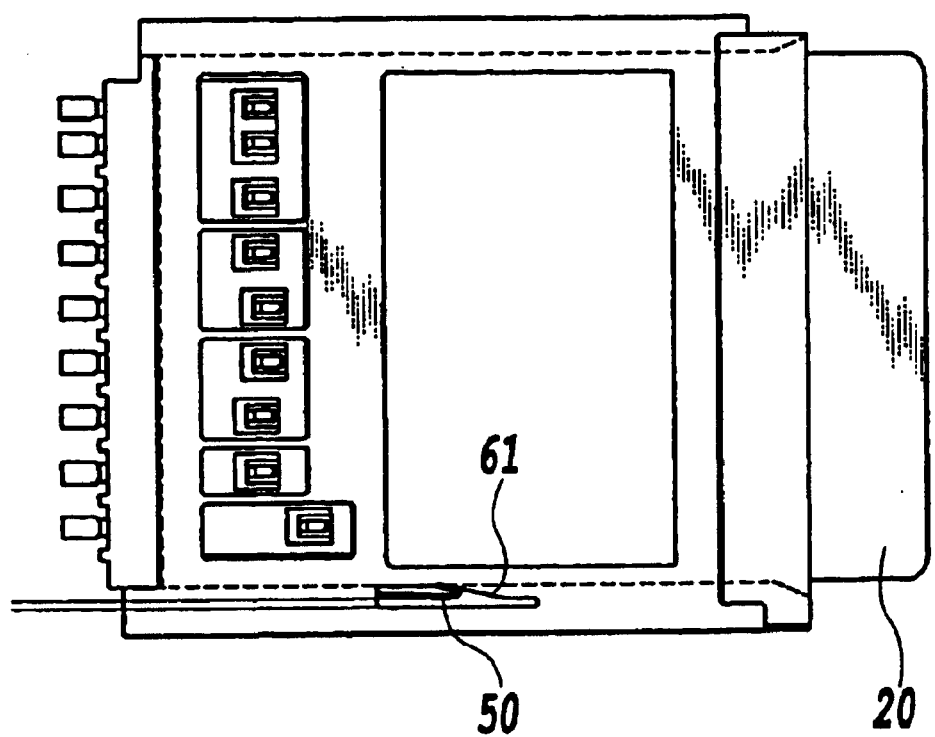
FIG. 13 is a plan view showing a state of the card connector of the first embodiment when a one-stage thickness card is inserted.
Figure 14:
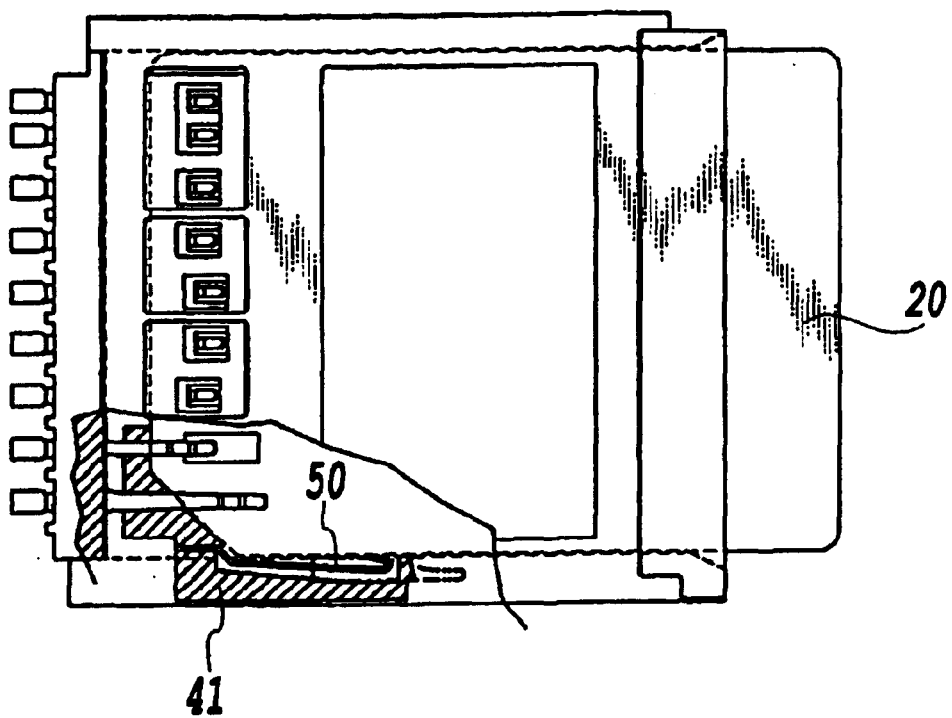
FIG. 14 is a partially cutaway plan view showing the state of the card connector of the first embodiment when the one-stage thickness card is inserted.
Figure 15:
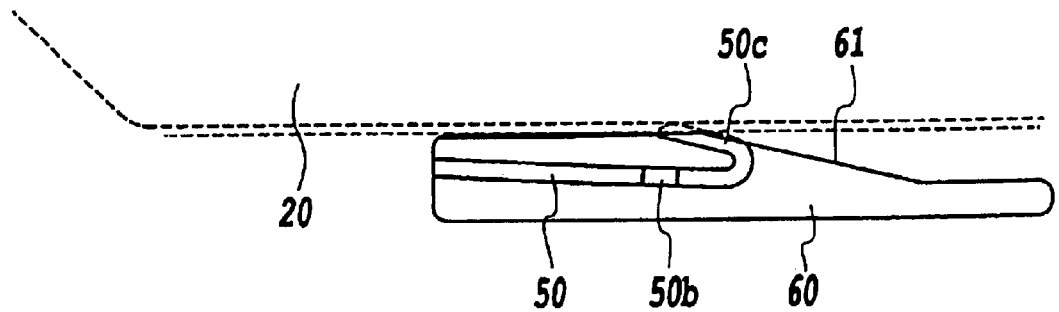
FIG. 15 is a partially enlarged view of FIG. 13.

FIG. 13 to FIG. 15 show the state of the elastic locking piece 50 when the one-stage thickness card 20 is inserted.

When the one-stage thickness card 20 is inserted, the eject member 41 is pushed toward the far side of the connector 1 by the front end of the card 20. At the same time, the elastic locking piece 50 is also moved toward the far side of the connector 1. The one-stage thickness card 20 is not formed with the recess 18 which the two-stage thickness card 10 has, and the elastic locking piece 50, as it is moved to the far side, deforms elastically until the free end of the locking portion 50c engages the side wall of the one-stage thickness card 20, as shown in FIG. 13 to FIG. 15. At this time, the protruding portion 50b is situated at a position spaced from the side wall of the card 20, as shown in FIG. 15. The guide hole 60 is so set in shape and size that it does not interfere with the displacement of the protruding portion 50b.

Thus, the connector 1 can also accept the one-stage thickness card 20 not formed with the recess 18. When the one-stage thickness card 20 is inserted, the elastic locking piece 50 works not as a card locking member but as a brake piece that applies a contact pressure to the card for braking.

When the one-stage thickness card 20 is ejected, the elastic locking piece 50 at first moves forwardly together with the card with the free end of the locking portion 50c in contact with the side wall of the one-stage thickness card 20. Then, after the protruding portion 50b of the elastic locking piece 50 has come into contact with the guide surface 61 of the guide hole 60, the protruding portion 50b moves along the guide surface 61. As a result, the elastic locking piece 50 returns to the original standby position shown in FIG. 7.

As described above, in the card connector of the first embodiment that can accept two kinds of cards—the one-stage thickness card 20 and the two-stage thickness card 10—the two-stage thickness card 10 is formed with the recess 18; the eject member 41 that slides together with the card as the card is inserted and retracted is attached with the elastic locking piece 50; and when the card is inserted or retracted, the protruding portion 50b of the elastic locking piece 50 is guided along the guide surface 61 of the guide hole 60 formed in the metal cover 3 to engage the locking portion 50c of the elastic locking piece 50 in, or disengage it from, the recess 18 of the two-stage thickness card 10. The locking portion 50c of the elastic locking piece 50 can therefore adopt a hook-shaped locking structure that completely blocks the movement of the card in the retraction direction. Hence, the card 10 can be prevented from falling out inadvertently or due to unexpected external force and be securely held during the insertion process.

Further, with the first embodiment, when the one-stage thickness card 20 is inserted, the elastic locking piece 50 works as a brake piece that applies a contact pressure to the card 20. This can prevent to a certain degree the one-stage thickness card 20 from falling out.

As described above, in the first embodiment, the tapered guide surface 61 is provided on the connector housing side to displace the elastic locking piece 50, which is partly in contact with the tapered guide surface 61, toward and away from the card.

In the above embodiment, the protruding portion 50b of the elastic locking piece 50 is projected upward and the guide hole 60 with the guide surface 61 is formed in the metal cover 3 disposed over the housing. It is also possible to project the protruding portion 50b downward and form the guide hole 60 in the base plate of the connector housing.

Second Embodiment

The second embodiment of the card connector according to this invention will be described by referring to FIG. 16 to FIG. 19.

Figure 16:
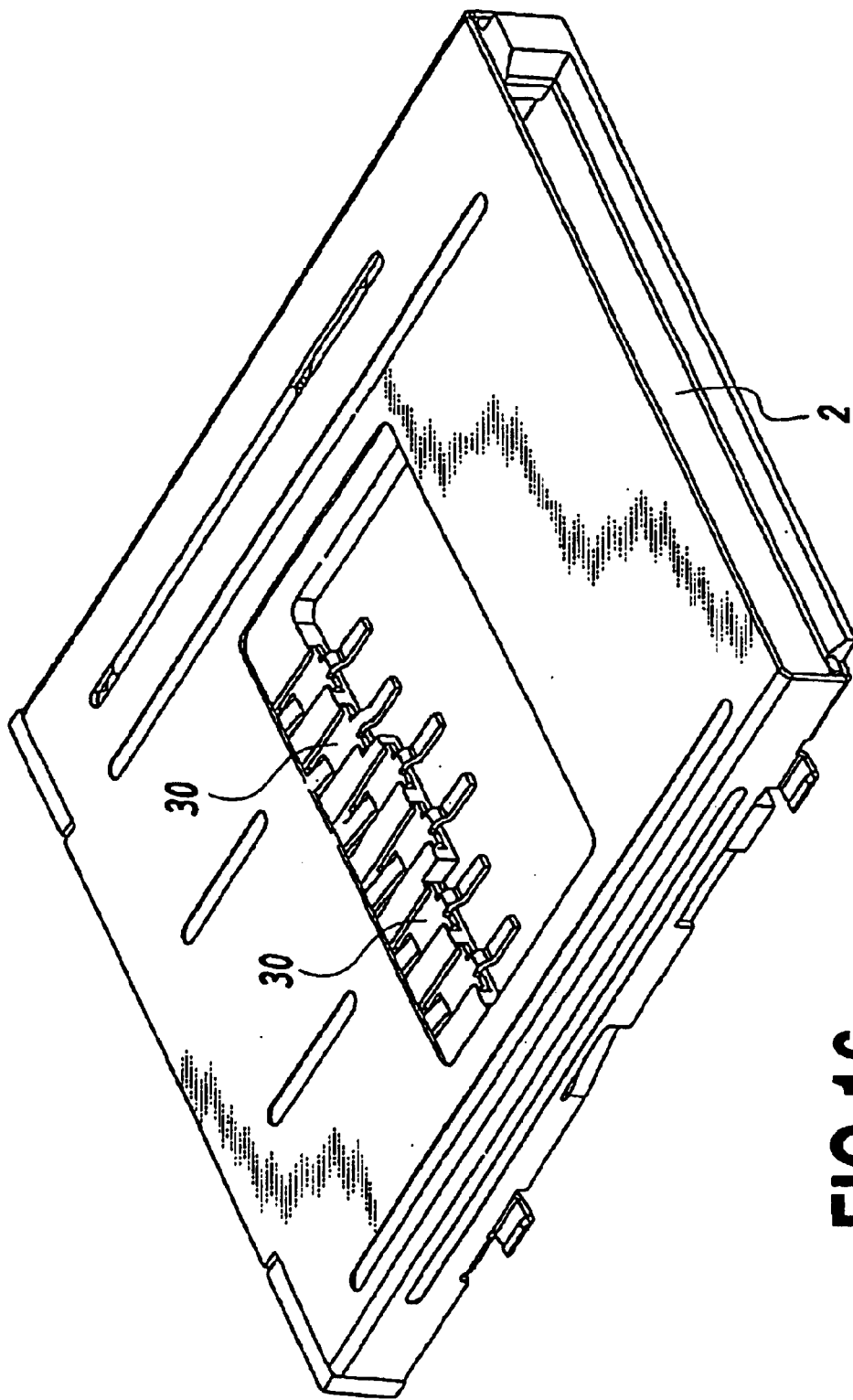
FIG. 16 is an external perspective view of the card connector as a second embodiment of the invention.
Figure 17:
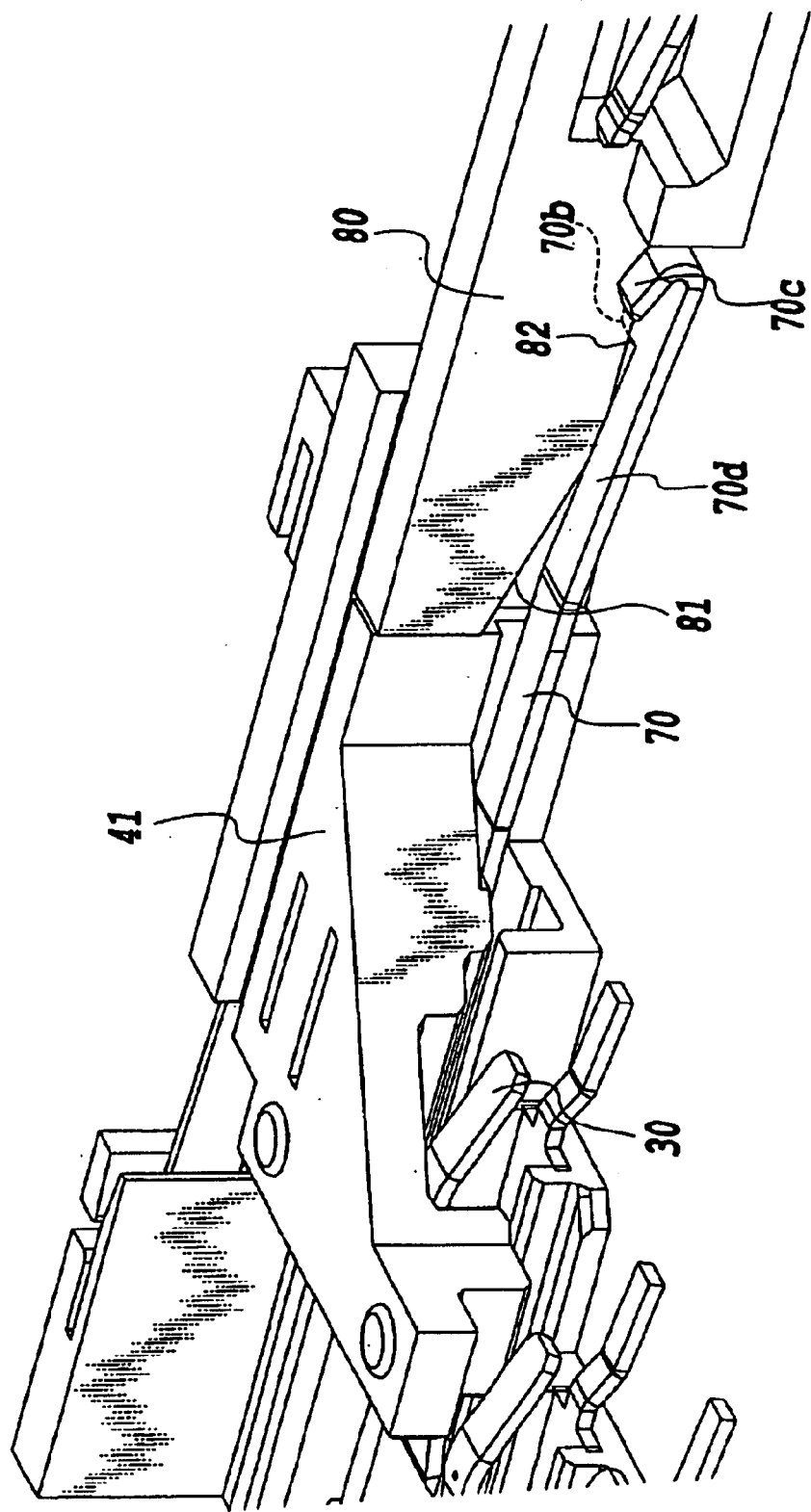
FIG. 17 is a perspective view showing an example card locking mechanism of the second embodiment when a card is not inserted or when the card is ejected.
Figure 18:
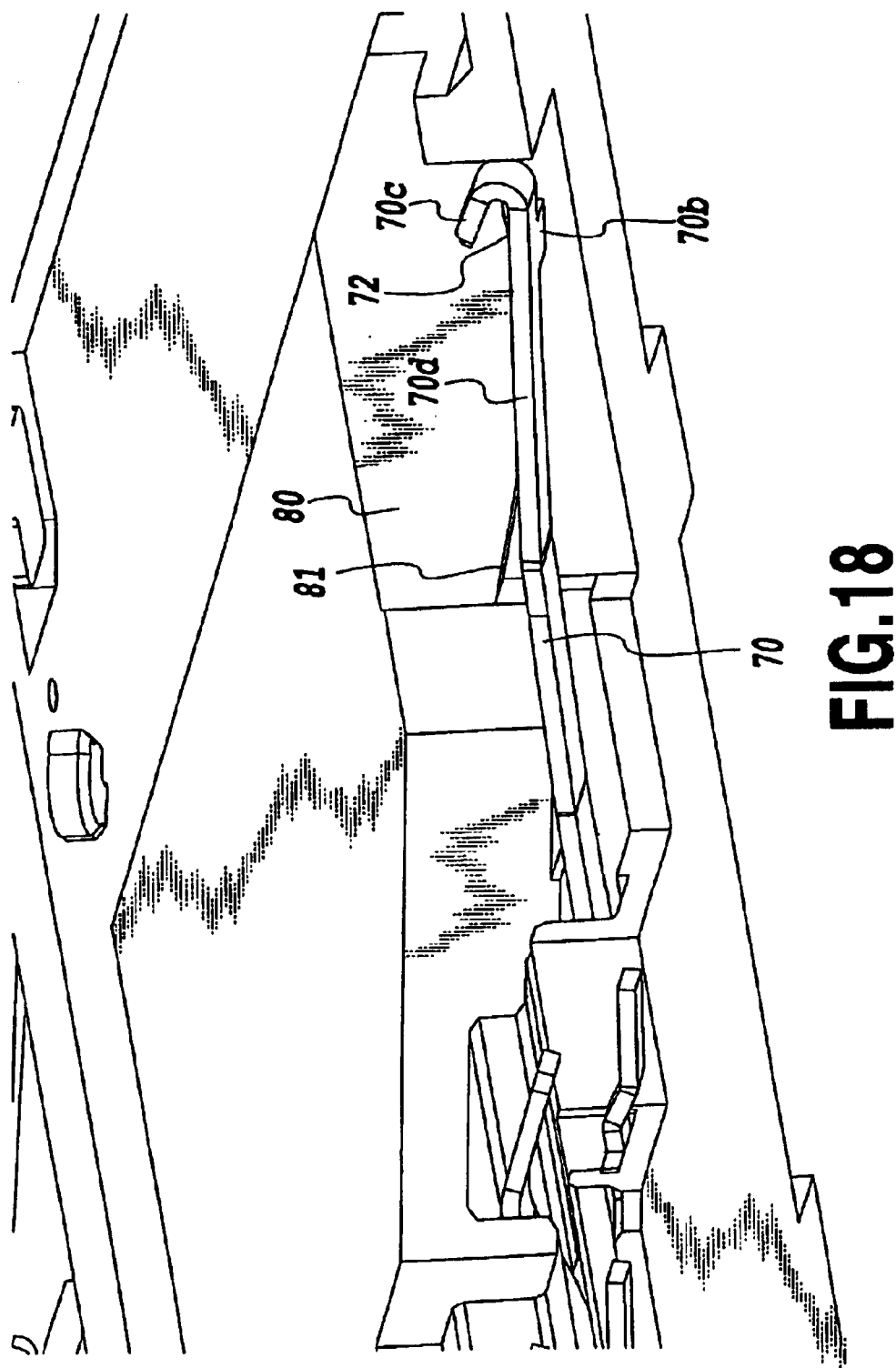
FIG. 18 is a perspective view of the same card locking mechanism of FIG. 17 when seen from the underside of the connector.
Figure 19:
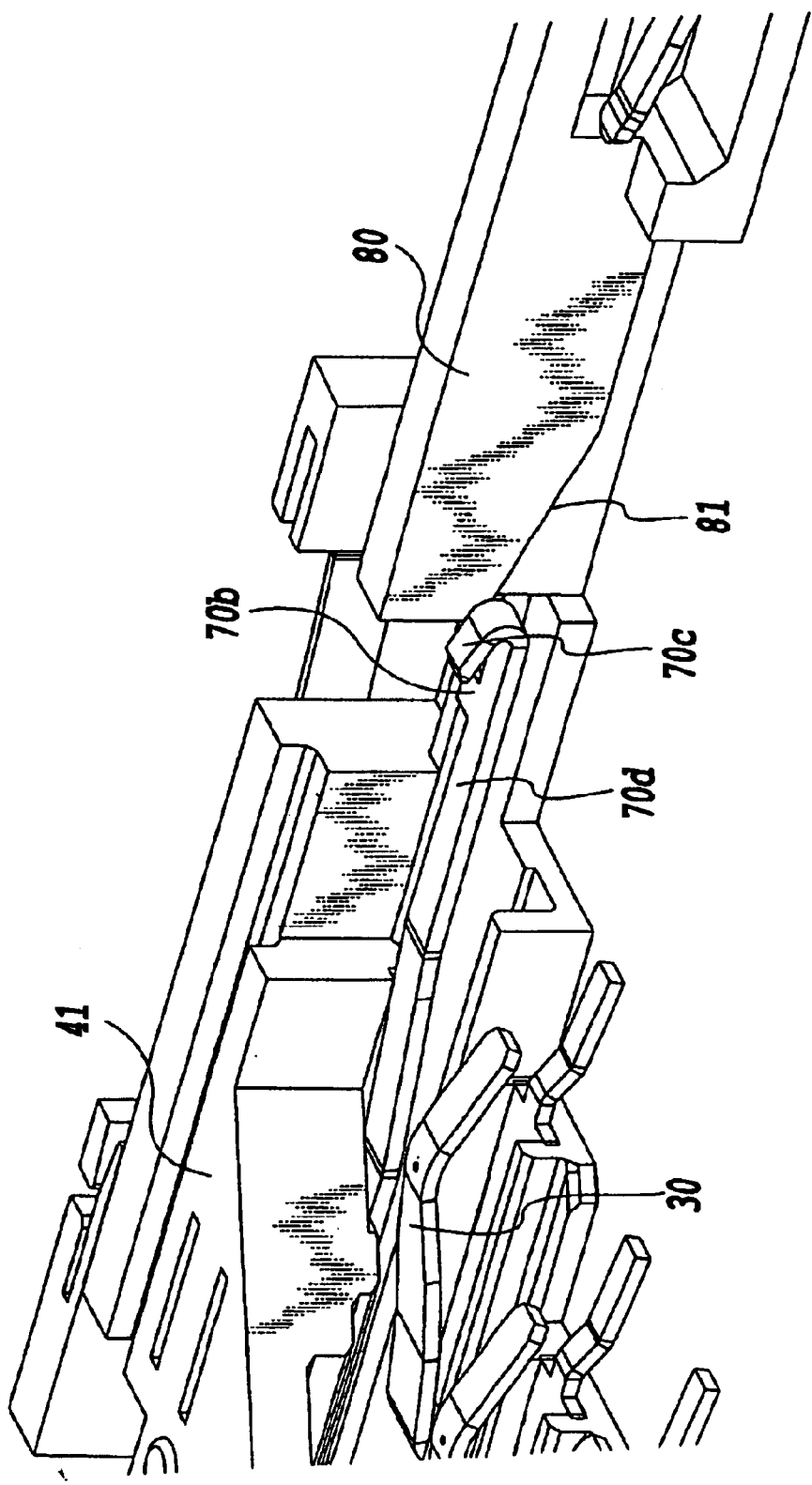
FIG. 19 is a perspective view showing the card locking mechanism of the second embodiment when the card is inserted.

FIG. 16 is an overall perspective view of the card connector of the second embodiment. FIG. 17 is a perspective view showing the card lock mechanism (card not shown) when the card is not inserted or it is ejected. FIG. 18 is a perspective view of the same state as FIG. 17 as seen from the underside of the connector. FIG. 19 is a perspective view showing the card lock mechanism (card not shown) when the card is inserted.

In the second embodiment as shown in these figures, the contact terminals 30 are a folded type which is secured at one end to the bottom side of the connector housing 2 and folded and projected upwardly.

While in the preceding first embodiment the elastic locking piece 50 is elastically moved toward and away from the side surface of the card, the second embodiment elastically moves an elastic locking piece 70 vertically toward and away from the bottom surface (in this case, contact pad surfaces) of the card. The elastic locking piece 70, as in the first embodiment, is secured to the eject member 41 and moves together with it. The elastic locking piece 70 has a protruding portion 70b protruding sideways, a hook-shaped locking portion 70c to be engaged in the recess 18 of the two-stage thickness card 10, and a spring portion 70d.

The second embodiment has a guide block 80 with a tapered guide surface (cam surface) 81 in the connector housing 2, instead of the guide surface 61 of the guide hole 60 in the first embodiment, in order that the protruding portion 70b of the elastic locking piece 70 can be vertically guided along the guide surface 81 as the eject member 41 moves.

In such a connector structure, when the card is not inserted or it is ejected, the elastic locking piece 70 is situated at a position shown in FIG. 17 or FIG. 18 according to the standby position of the eject member 41. At this position, because the protruding portion 70b engages a width portion 82 of the guide block 80, the locking portion 70c of the elastic locking piece 70 stands by outside the bottom surface (contact pad surfaces) of the two-stage thickness card 10. Hence, no force or load is developed when the card is inserted.

When the two-stage thickness card 10 is inserted, the eject member 41 is pushed toward the far side of the connector 1 by the card 10, as shown in FIG. 19. At the same time, the elastic locking piece 70 is also moved toward the far side of the connector 1. As a result of this motion, the protruding portion 70b moves along the guide surface 81 of the guide block 80 by the elastic recovery force of the elastic locking piece 70 until finally it disengages from the guide surface 81, as shown in FIG. 19. Hence, the elastic locking piece 70 eventually becomes free from the restriction of the guide surface 81.

Thus, the locking portion 70c of the elastic locking piece 70 moves toward the bottom surface of the card 10 until it fits into the recess 18 of the card 10 from below and becomes locked there.

In this second embodiment, too, when the one-stage thickness card 20 is inserted, the elastic locking piece 70 works as a brake piece, not as the locking piece, as in the first embodiment.

Therefore, in the second embodiment also, the two-stage card can be reliably locked and prevented from falling out inadvertently or due to unexpected external force.

As in the first embodiment, this second embodiment uses the tapered guide surface 81 provided on the connector housing side to displace the elastic locking piece 70, which is partly in contact with the guide surface 81, toward and away from the card.

Although in the second embodiment the locking portion 70c of the elastic locking piece 70 fits into the recess 18 of the card 10 from below, it is also possible to engage the locking portion 70c in the recess 18 of the card 10 from above.

Third Embodiment

The third embodiment of the card connector according to this invention will be described by referring to FIG. 20 to FIG. 29.

Figure 20:
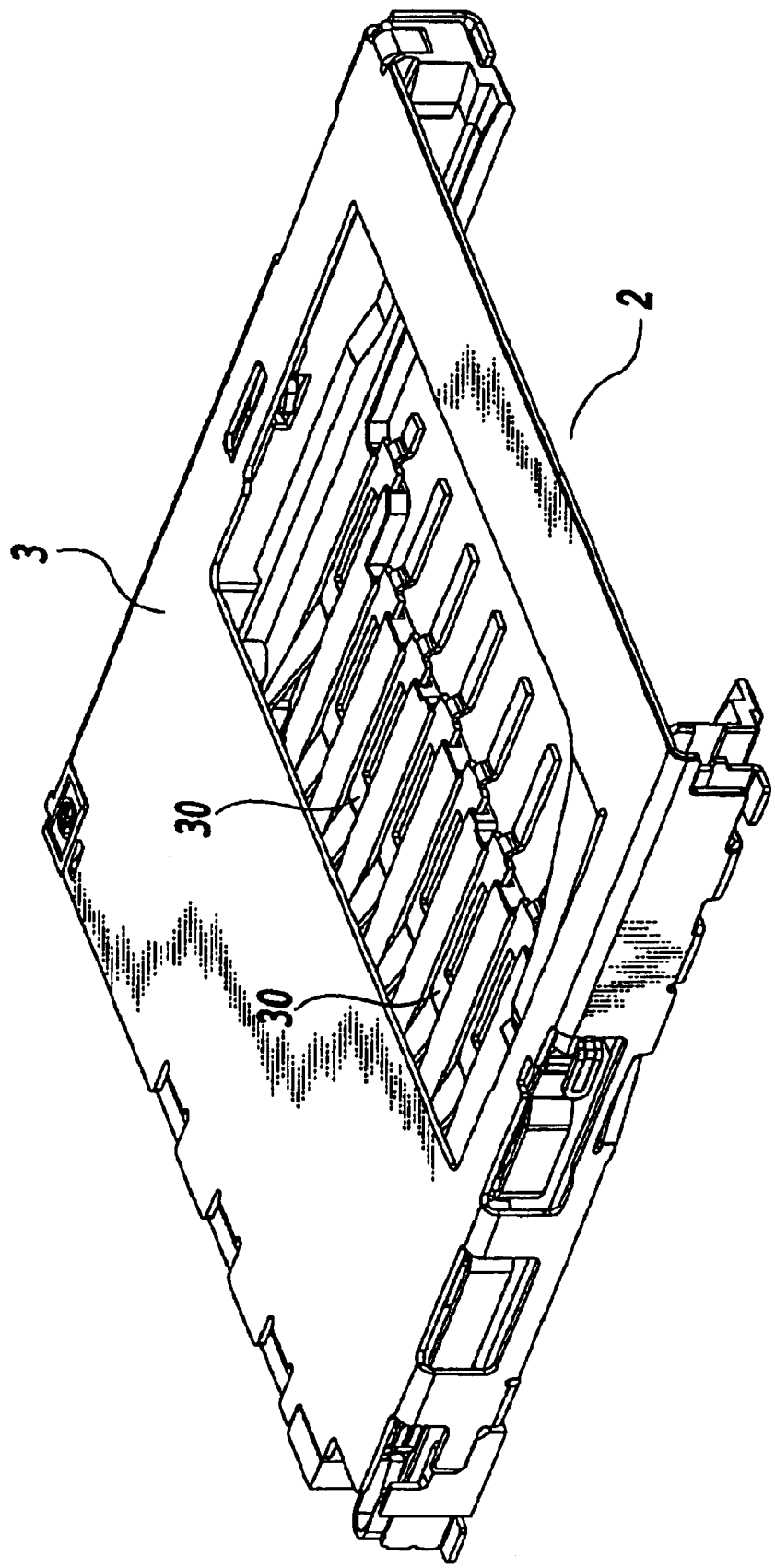
FIG. 20 is an external perspective view of the card connector as a third embodiment of the invention.
Figure 21:
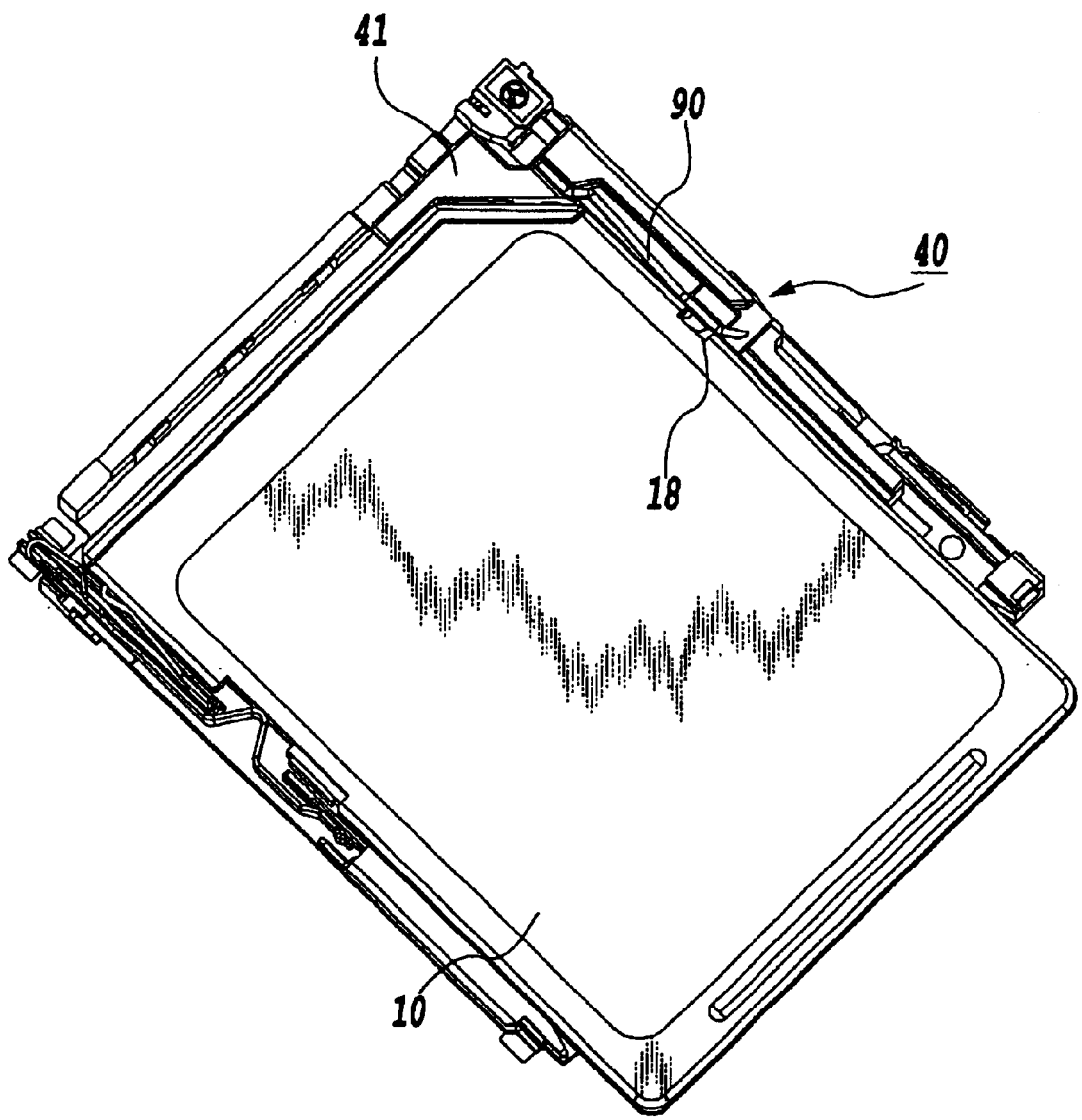
FIG. 21 is a perspective view showing a card-locked state in the third embodiment with a metal cover removed.
Figure 22:
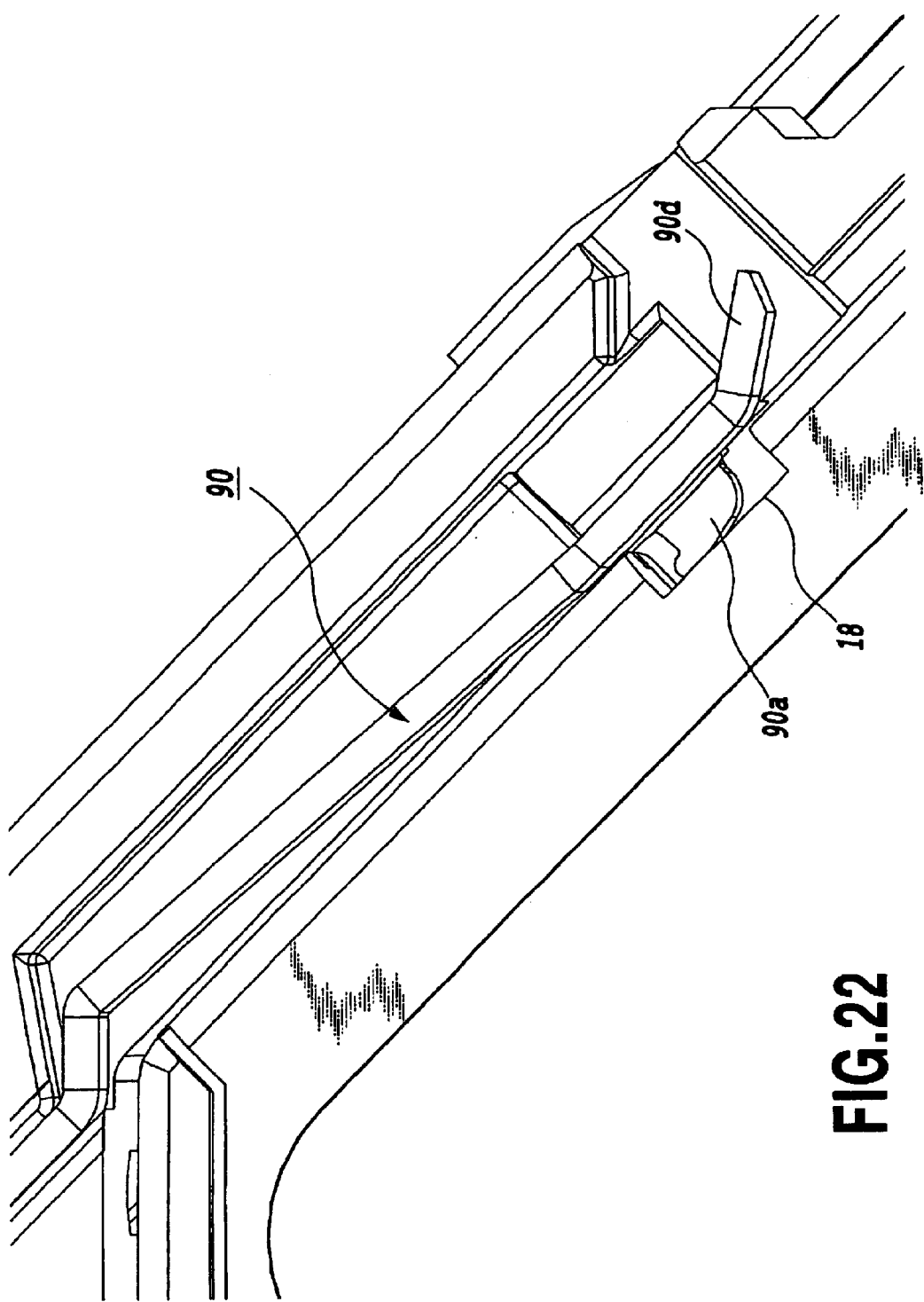
FIG. 22 is an enlarged perspective view showing a card locking portion of the third embodiment in the card-clocked state.
Figure 23:
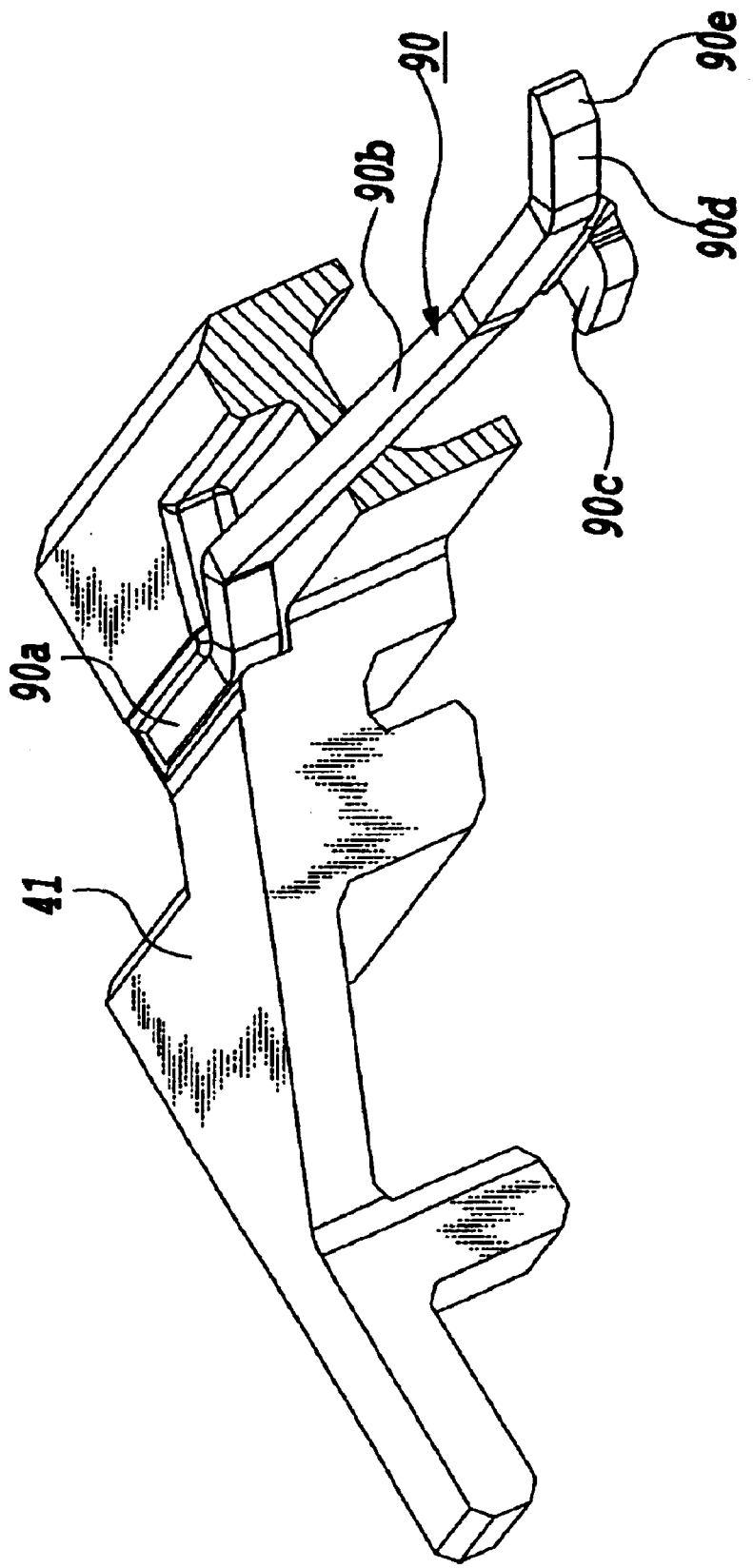
FIG. 23 is a perspective view showing an elastic locking piece secured to an eject member of the third embodiment.
Figure 24:
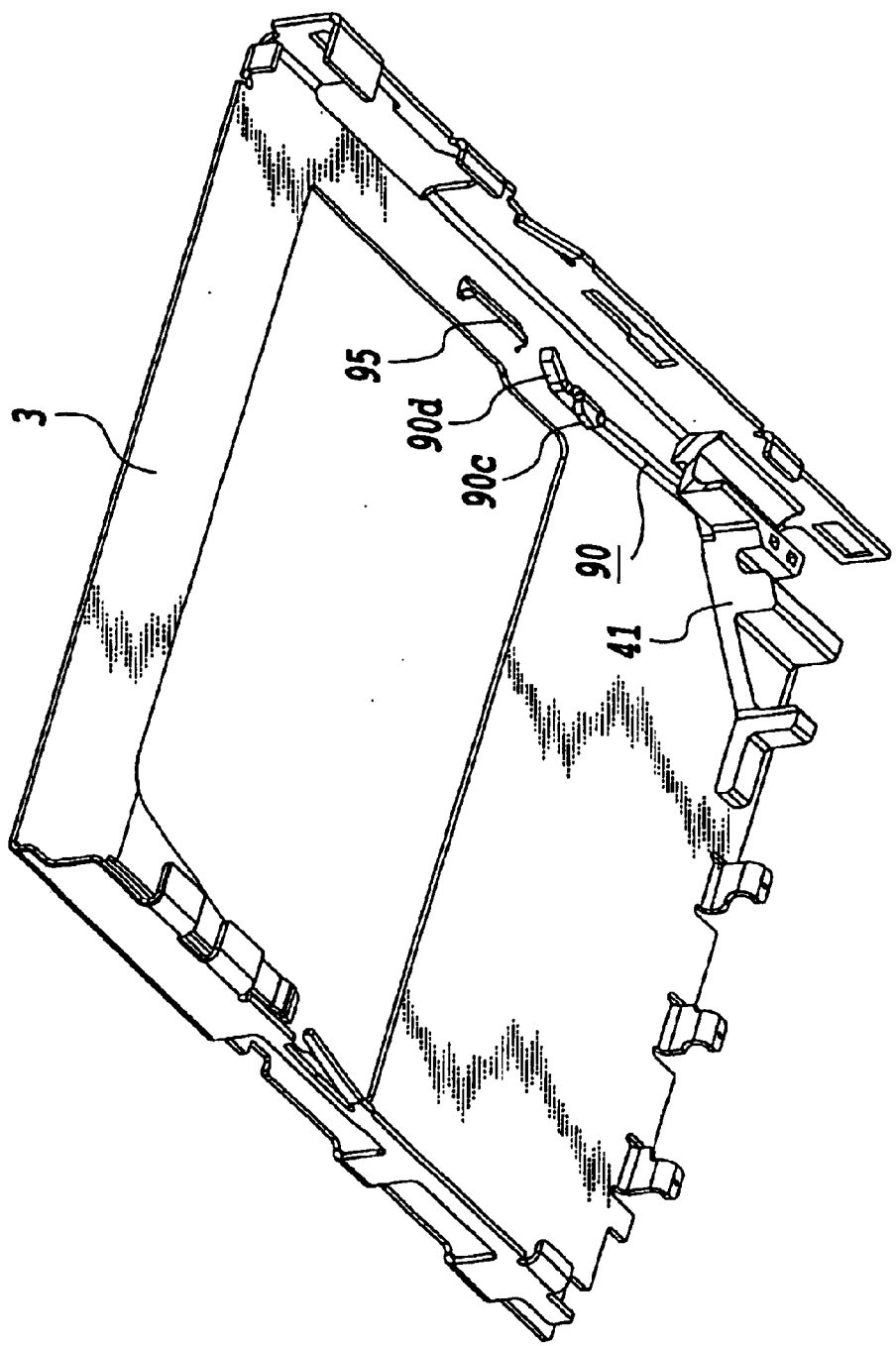
FIG. 24 is a perspective view showing the metal cover and the elastic locking piece of the third embodiment in the card-locked state as seen from the underside.
Figure 25:
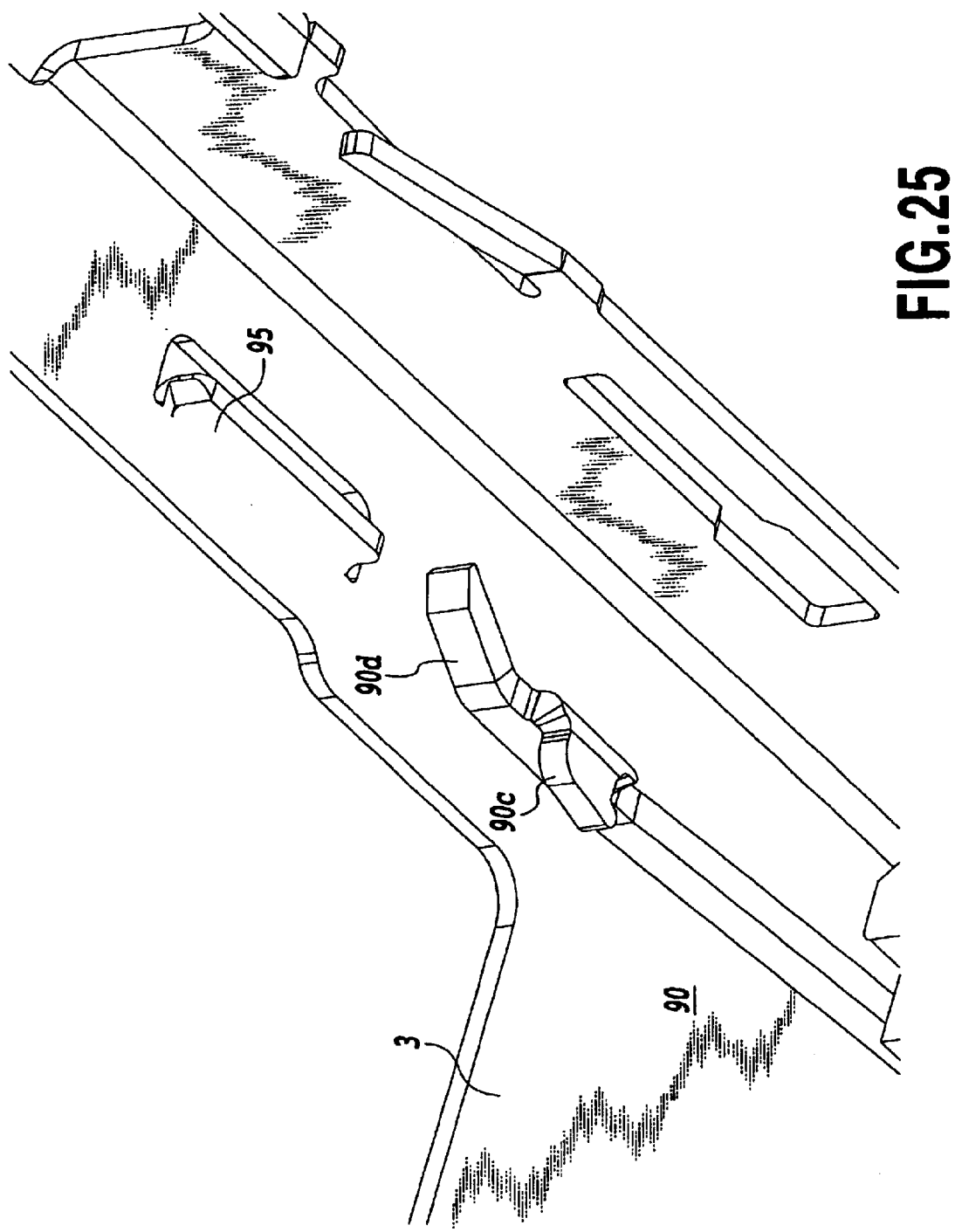
FIG. 25 is an enlarged perspective view showing an essential portion of FIG. 24.
Figure 26:
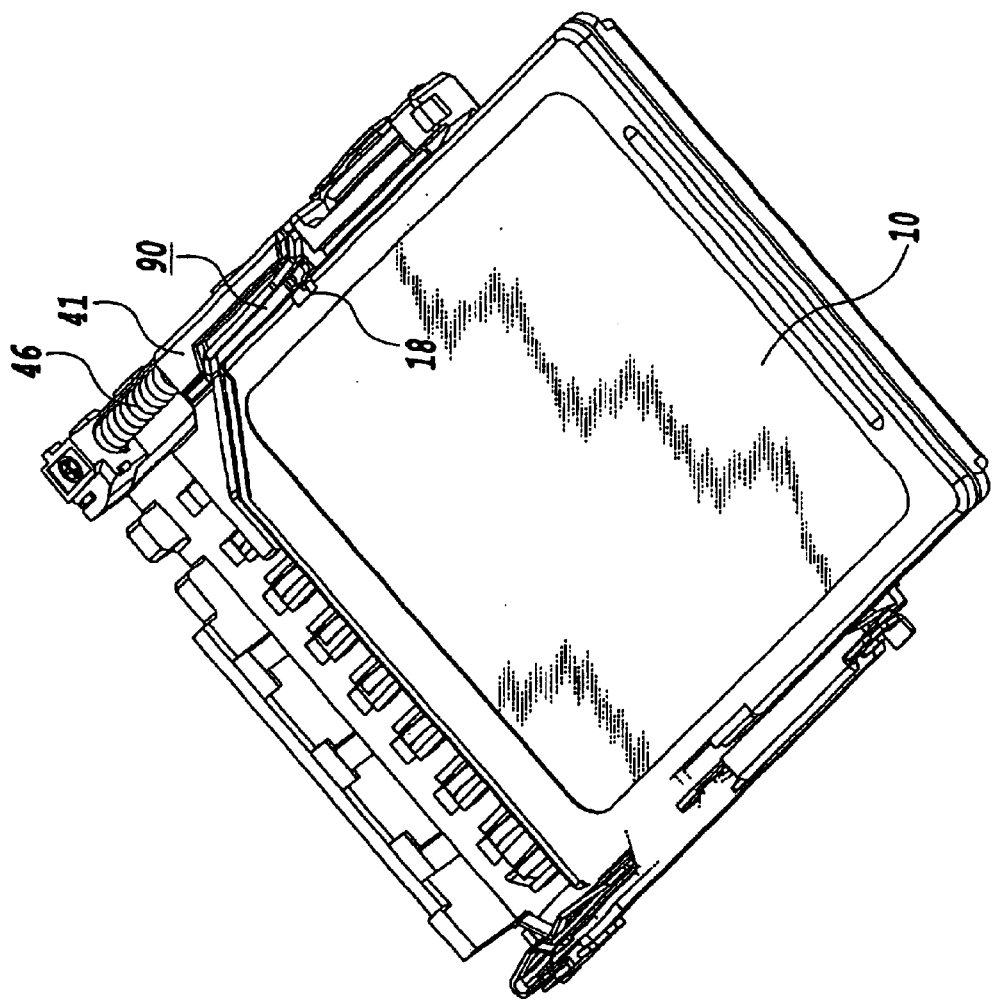
FIG. 26 is a perspective view showing the third embodiment in an unlocked state with the metal cover removed.
Figure 27:
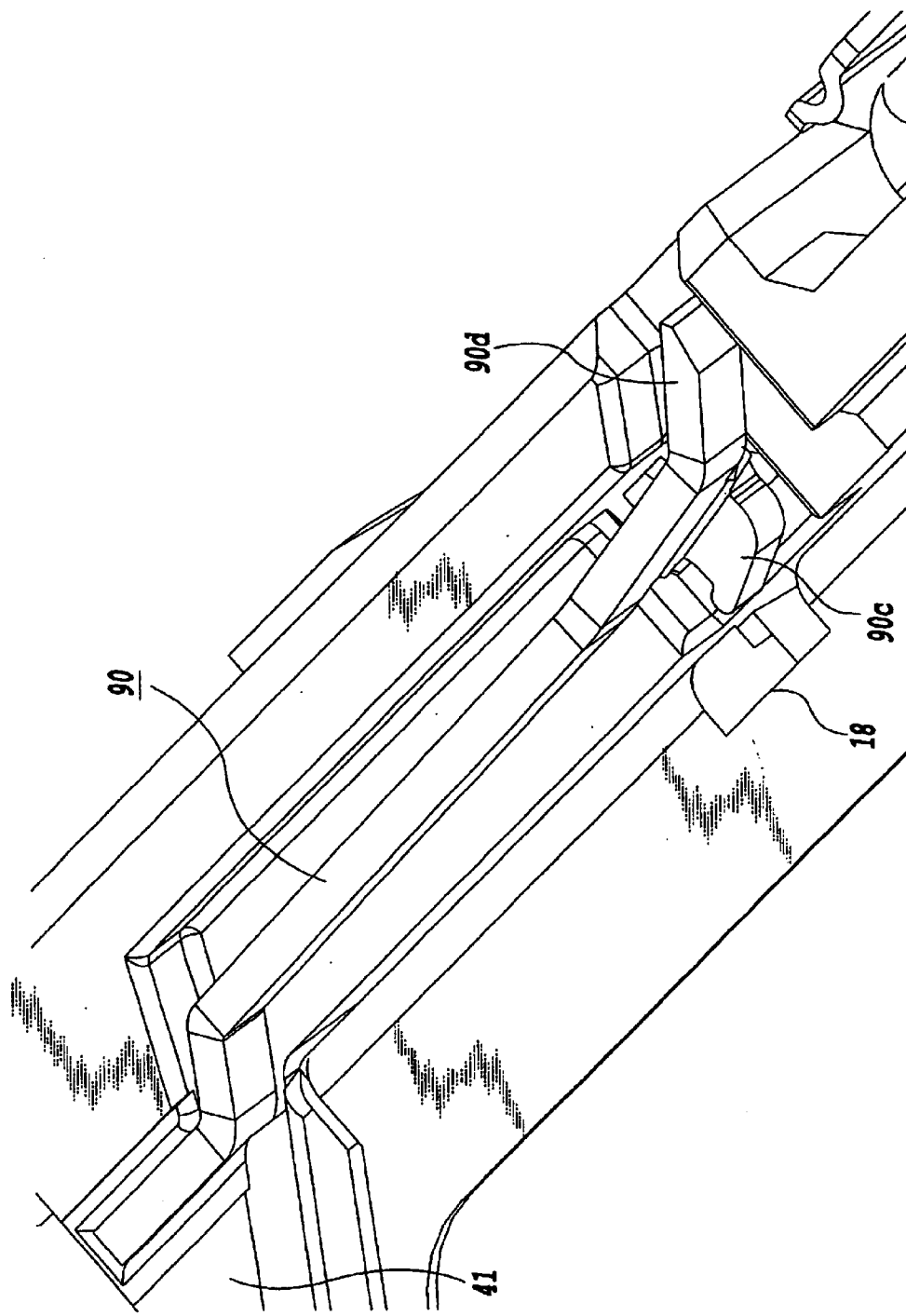
FIG. 27 is an enlarged perspective view showing the card locking portion of the third embodiment in the unlocked state.
Figure 28:
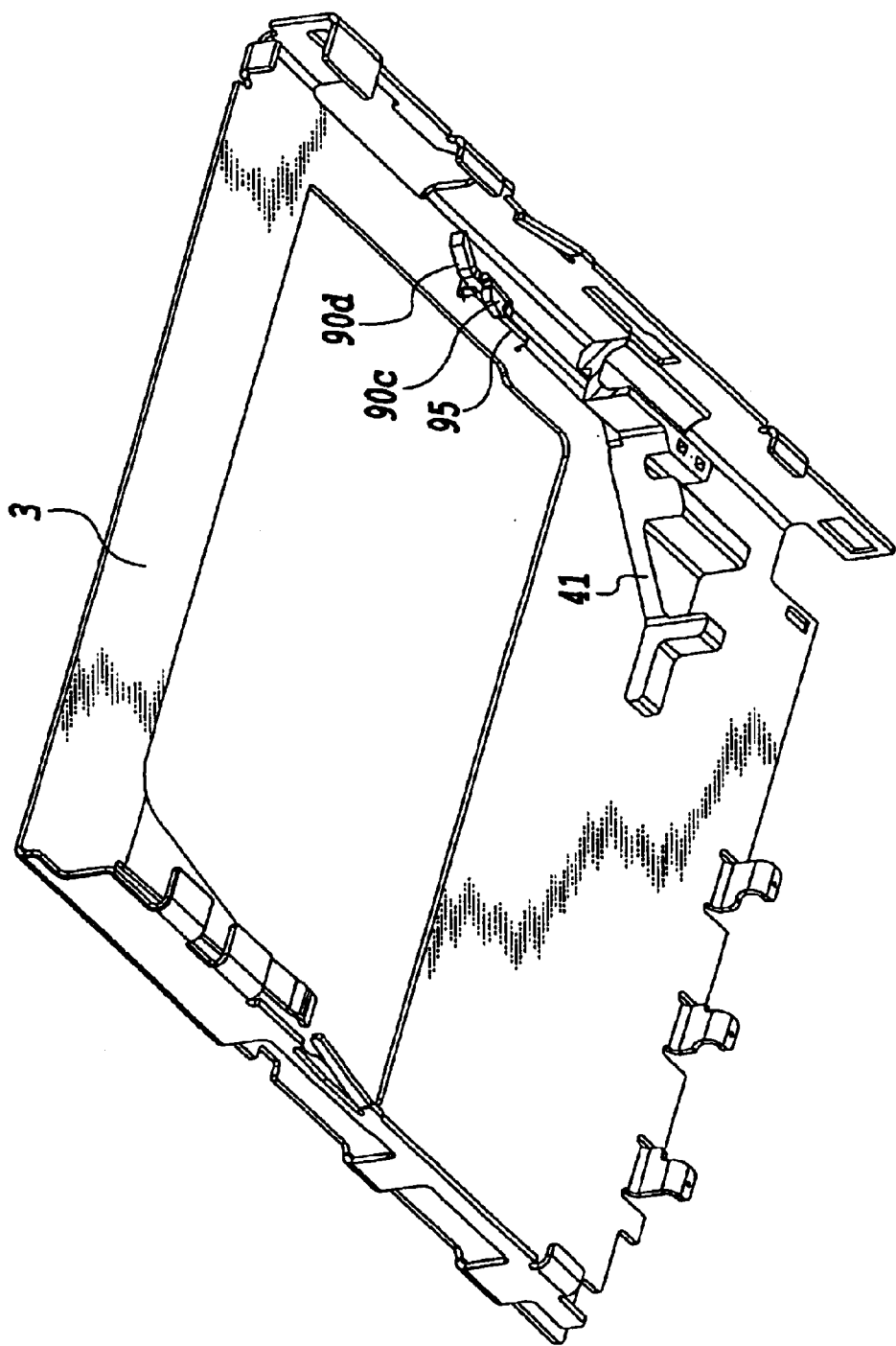
FIG. 28 is a perspective view showing the metal cover and the elastic locking piece of the third embodiment in the unlocked state as seen from the underside.
Figure 29:
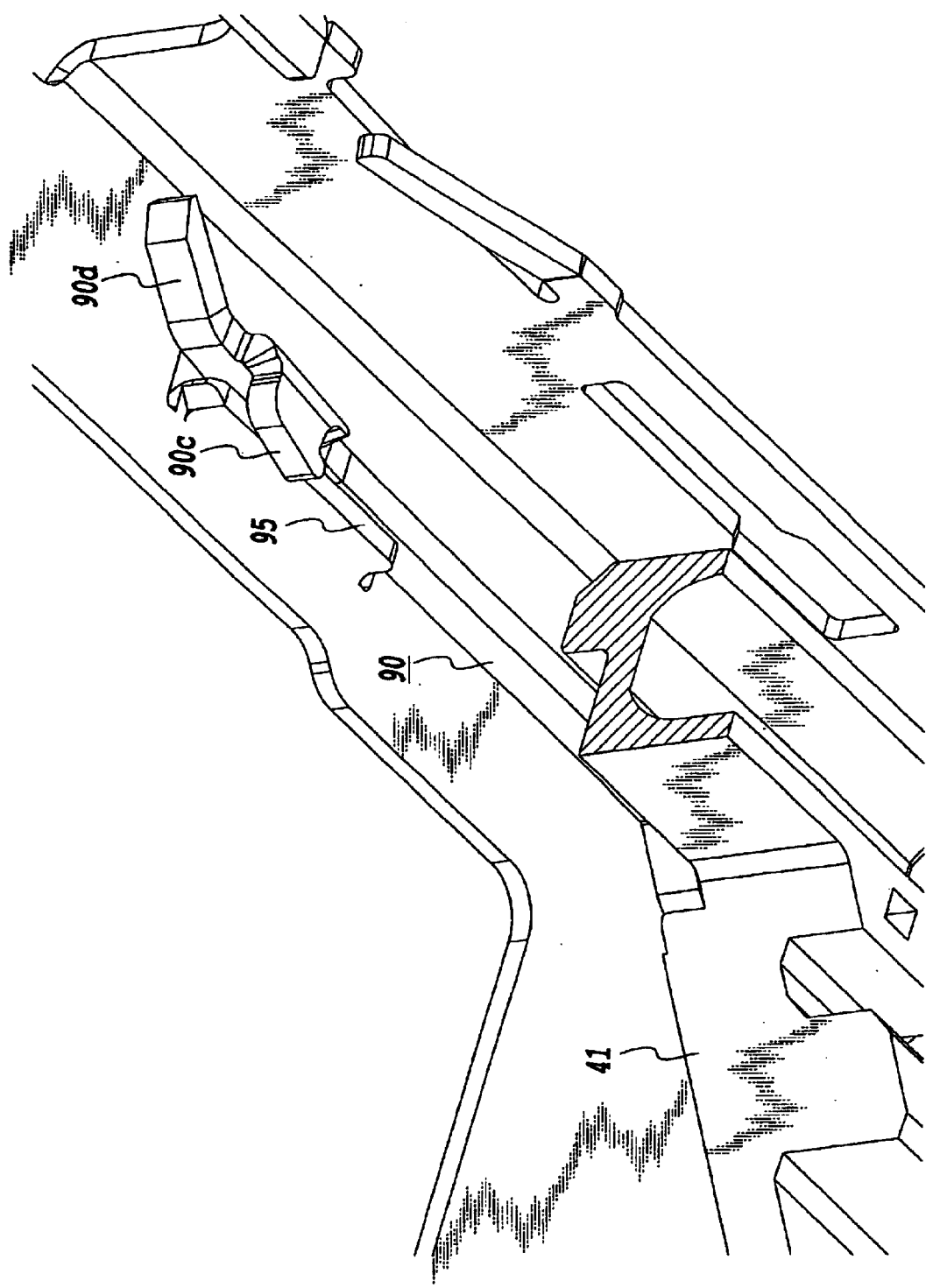
FIG. 29 is an enlarged perspective view showing an essential portion of FIG. 28.

FIG. 20 is an overall perspective view showing the card connector of the third embodiment. FIG. 21 shows the card connector in a card-locked state with the metal cover 3 removed. FIG. 22 is an enlarged view showing a card locking portion in the card-locked state. FIG. 23 shows an elastic locking piece secured by press fit to the eject member 41. FIG. 24 shows the metal cover 3 and the elastic locking piece in the card-locked state as seen from the underside. FIG. 25 is an enlarged view of an essential part in FIG. 24. FIG. 26 represents an unlocked state with the metal cover 3 removed. FIG. 27 is an enlarged view of the card locking portion in the unlocked state. FIG. 28 shows the metal cover 3 and the elastic locking piece in the unlocked state as seen from the underside. FIG. 29 is an enlarged view of an essential part in FIG. 28.

As shown in these figures, the third embodiment elastically displaces an elastic locking piece 90 toward and away from the side surface of the card as in the first embodiment.

The elastic locking piece 90 is secured by press fit to the eject member 41 (see FIG. 23) and moves together with it, as in the preceding embodiments. The eject member 41 is operated in a manner described earlier by the eject mechanism 40 which includes the heart cam 43, cam lever 45 and coil spring 46 as shown in FIG. 6.

The elastic locking piece 90 has, as shown in FIG. 23, a stationary portion 90a secured to the eject member 41, a spring portion 90b, a hook-shaped locking portion 90c projecting sideways to fit into the recess 18 of the two-stage thickness card 10, and a free end portion 90d bent sideways. The free end portion 90d of the elastic locking piece 90 is bent for reliable sliding along a guide piece 95 projecting from the back surface of the metal cover 3. The free end portion 90d is also formed at its end with a tapered surface 90e tapering off toward the tip to ensure the reliable sliding.

The third embodiment uses the guide piece 95 (a guiding projection) projecting from the back surface of the metal cover 3, as shown in FIG. 24 or FIG. 28, instead of the guide surface 61 of the guide hole 60 in the first embodiment or the guide block 80 in the second embodiment. The guide piece 95 is formed by bending a part of the metal cover 3 into a shape of letter L.

As the eject member 41 is moved, the free end bent portion 90d of the elastic locking piece 90 is brought into sliding contact with the guide piece 95 to elastically displace the elastic locking piece 90 away from the side surface of the card, thereby disengaging the locking portion 90c from the recess 18 of the two-stage thickness card 10.

In such a connector structure, when the card is not inserted or it is ejected, the elastic locking piece 90 is in contact with the guide piece 95 and elastically displaced, as shown in FIG. 26 to FIG. 29. In this state, the locking portion 90c of the elastic locking piece 90 stands by at a position outside the side surface of the two-stage thickness card 10 and thus it produces no load when the card is inserted.

When the two-stage thickness card 10 is inserted, the eject member 41 is pushed by the card 10 toward the far side of the connector 1, as shown in FIGS. 21, 22, 24 and 25. At the same time the elastic locking piece 90 is also moved toward the far side of the connector 1. As a result of this motion, the elastic locking piece 90 clears the guide piece 95, allowing the locking portion 90c to be moved toward the card 10 by the elastic recovery force of the spring portion 90b so that it fits into the recess 18 of the card 10 and is locked there.

In the third embodiment, as described above, the locking portion 90c of the elastic locking piece 90 is brought into or out of engagement with the recess 18 of the card 10 by disengaging the elastic locking piece 90 from or engaging it with the guide piece 95, respectively.

In the third embodiment, too, the elastic locking piece 90 is urged toward the side surface of the card, so that when the one-stage thickness card 20 is inserted, the elastic locking piece 90 works as a braking piece, not as a locking piece, as in the preceding embodiment.

In this third embodiment also, the two-stage thickness card can be reliably locked and prevented from falling out inadvertently or due to unexpected external force.

In the third embodiment, as described above, the elastic locking piece 90 is provided with the free end bent portion 90d, a means for moving the elastic locking piece 90 toward or away from the guide piece 95.

In the third embodiment, the elastic locking piece 90 may be displaced vertically as in the second embodiment. In that case, the free end bent portion 90d of the elastic locking piece 90 is bent vertically and the guide piece 95 is formed protruding from the metal cover 3 so as to displace the elastic locking piece 90 vertically.

Fourth Embodiment

The fourth embodiment of the card connector according to this invention will be explained by referring to FIG. 30 to FIG. 39.

Figure 30:
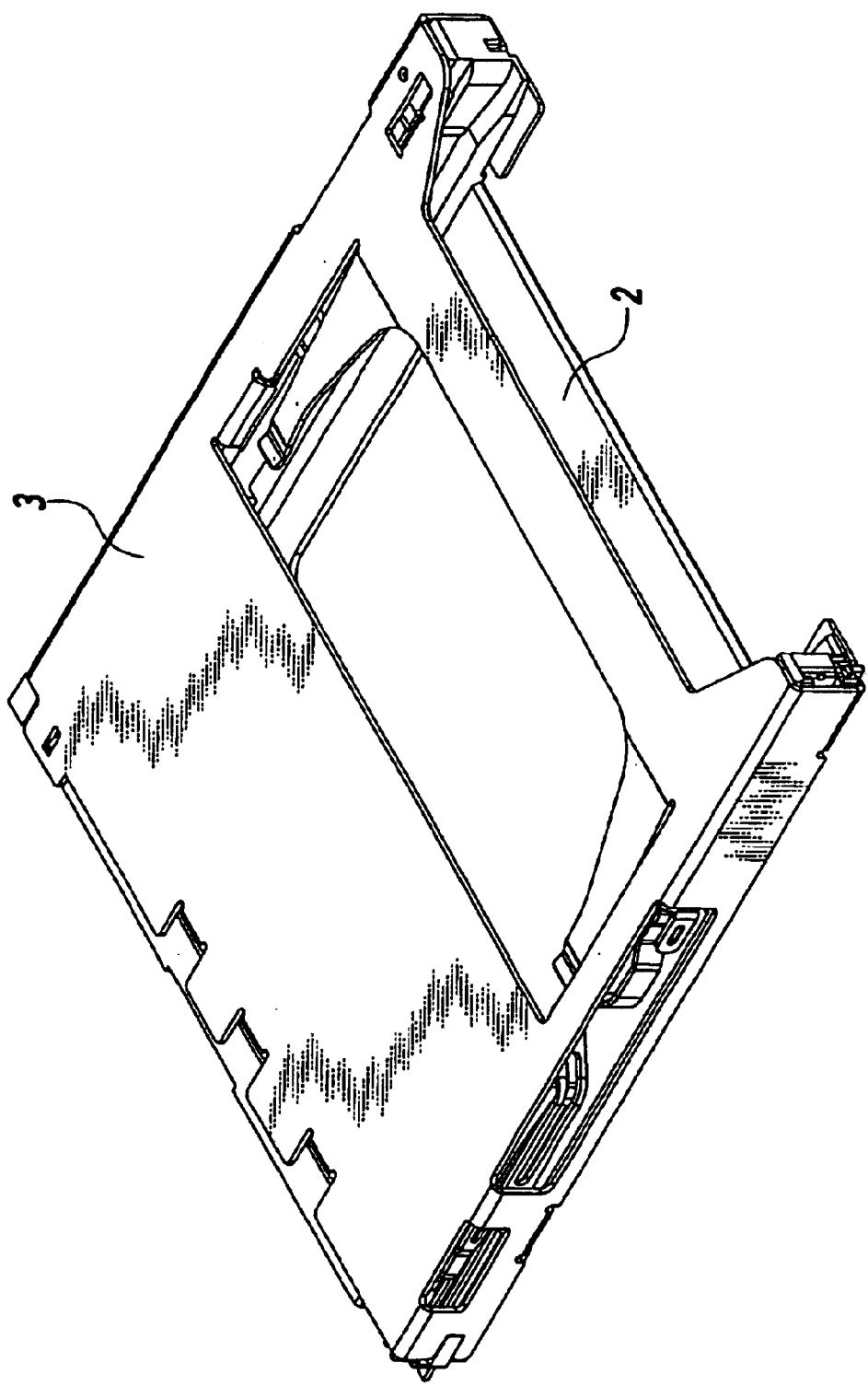
FIG. 30 is an external perspective view of the card connector as a fourth embodiment of the invention.
Figure 31:
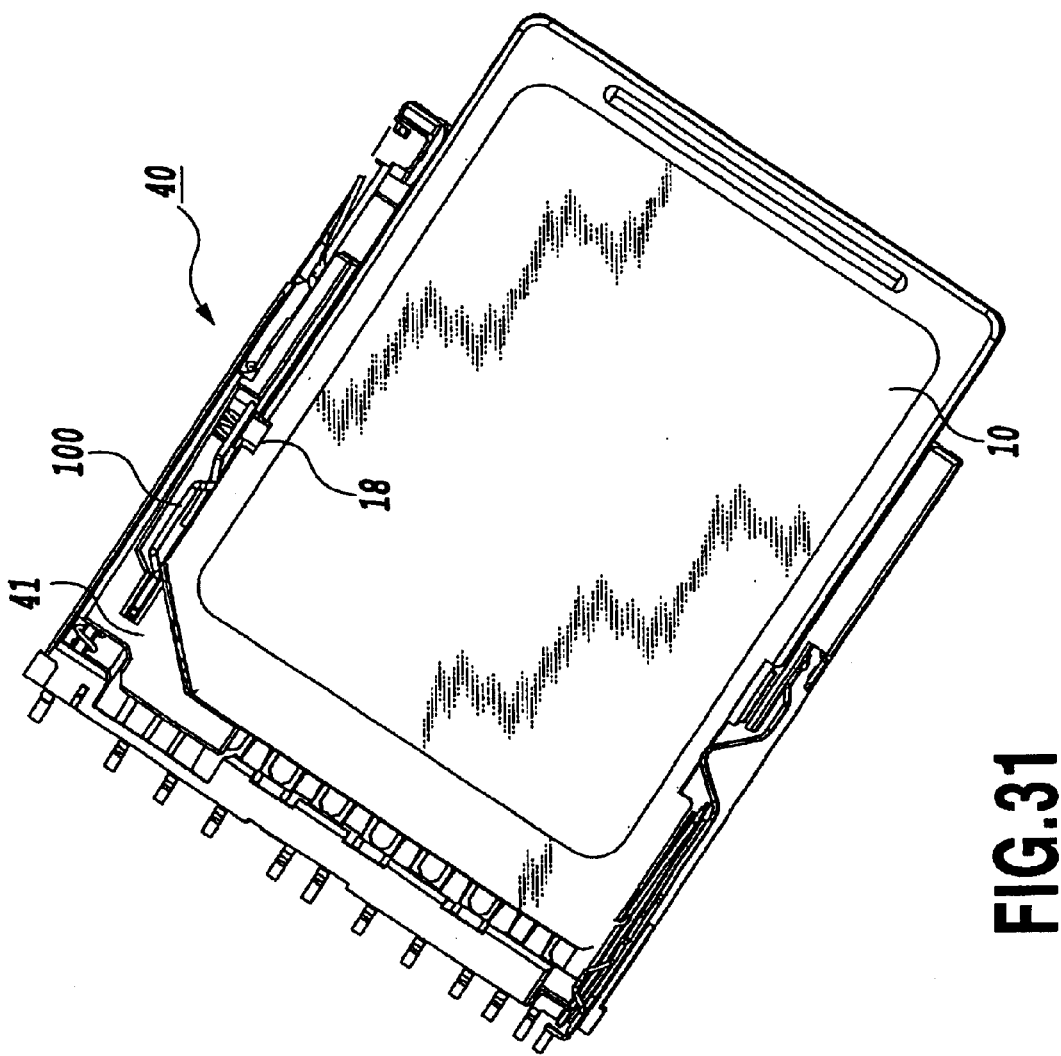
FIG. 31 is a perspective view of the card connector of the fourth embodiment in a card-locked state with the metal cover removed.
Figure 32:
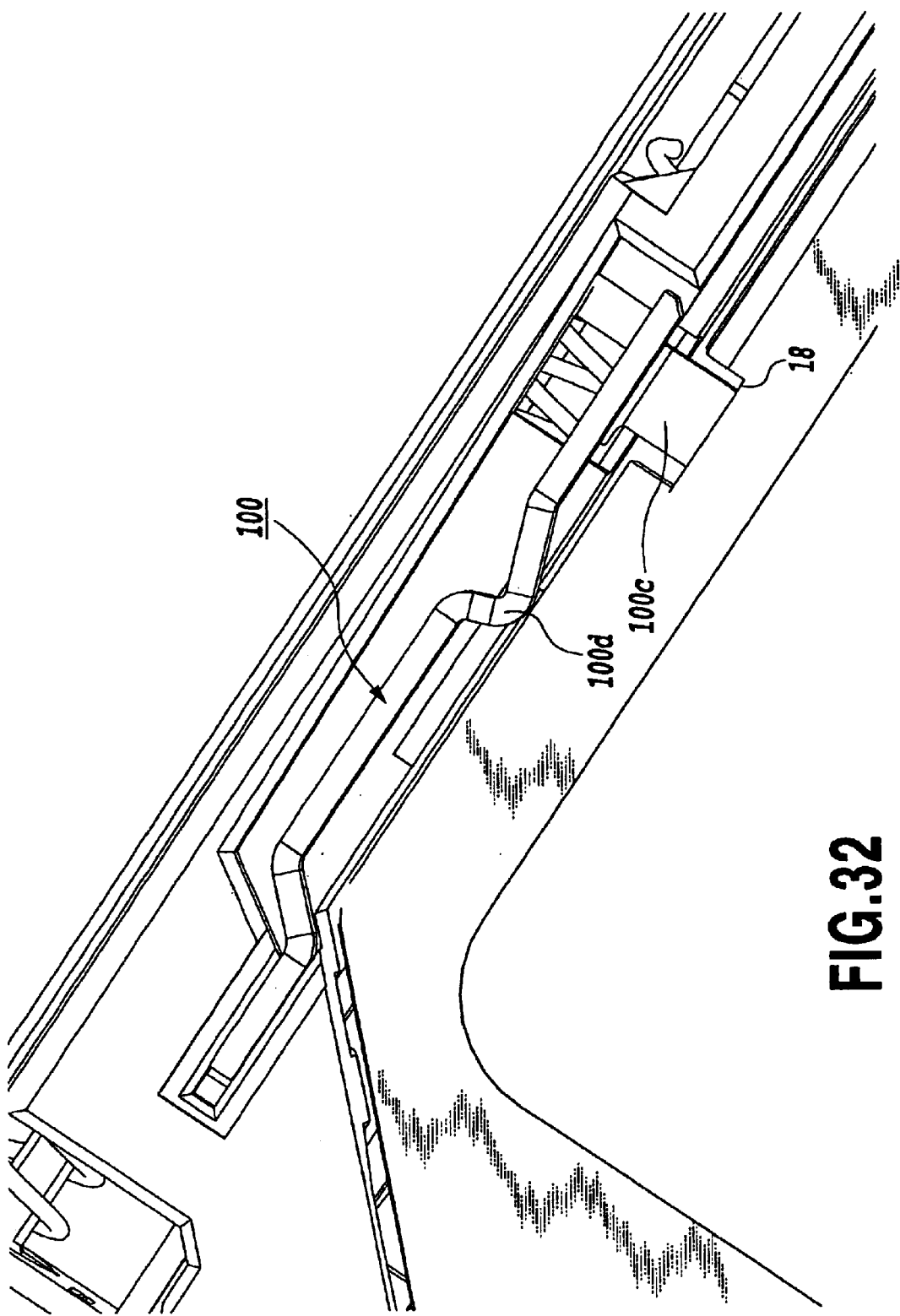
FIG. 32 is an enlarged perspective view showing the card locking portion of the fourth embodiment in the card-locked state.
Figure 33:
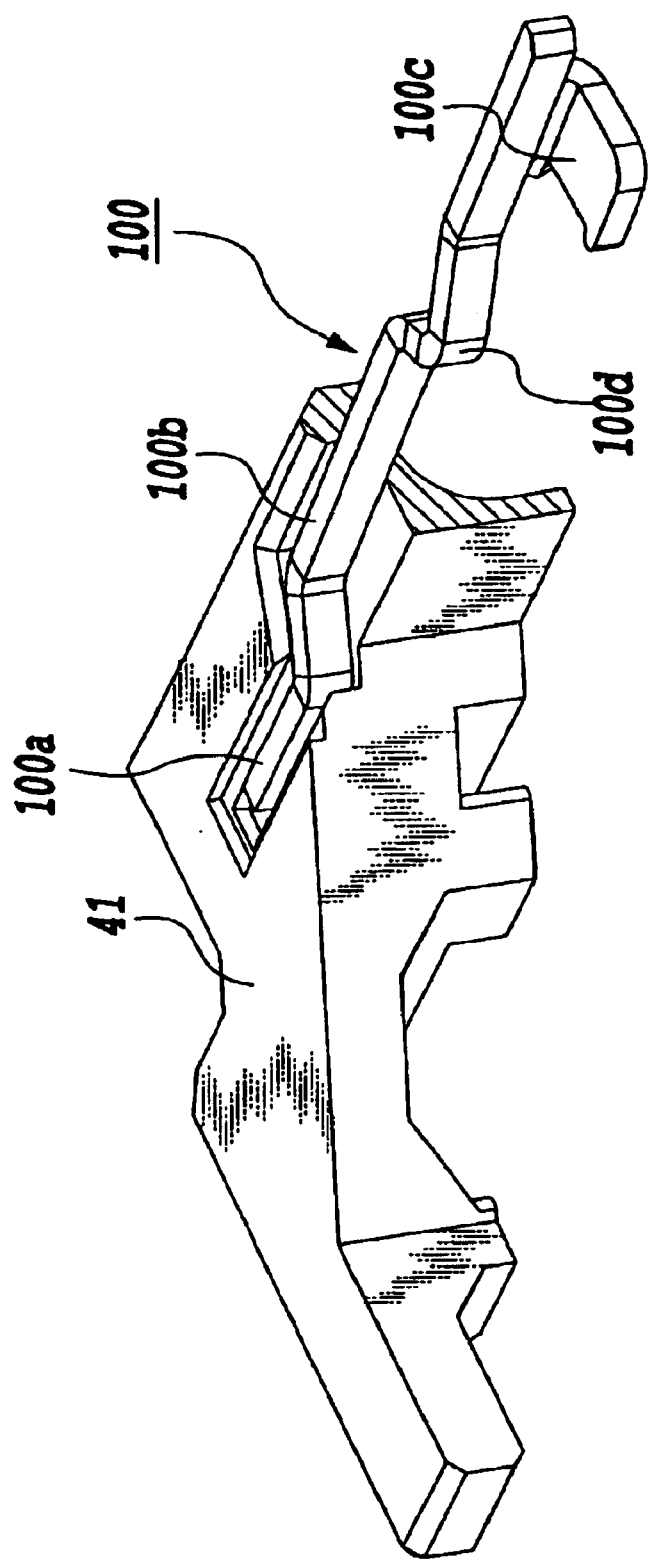
FIG. 33 is a perspective view showing the elastic locking piece secured to the eject member of the fourth embodiment.
Figure 34:
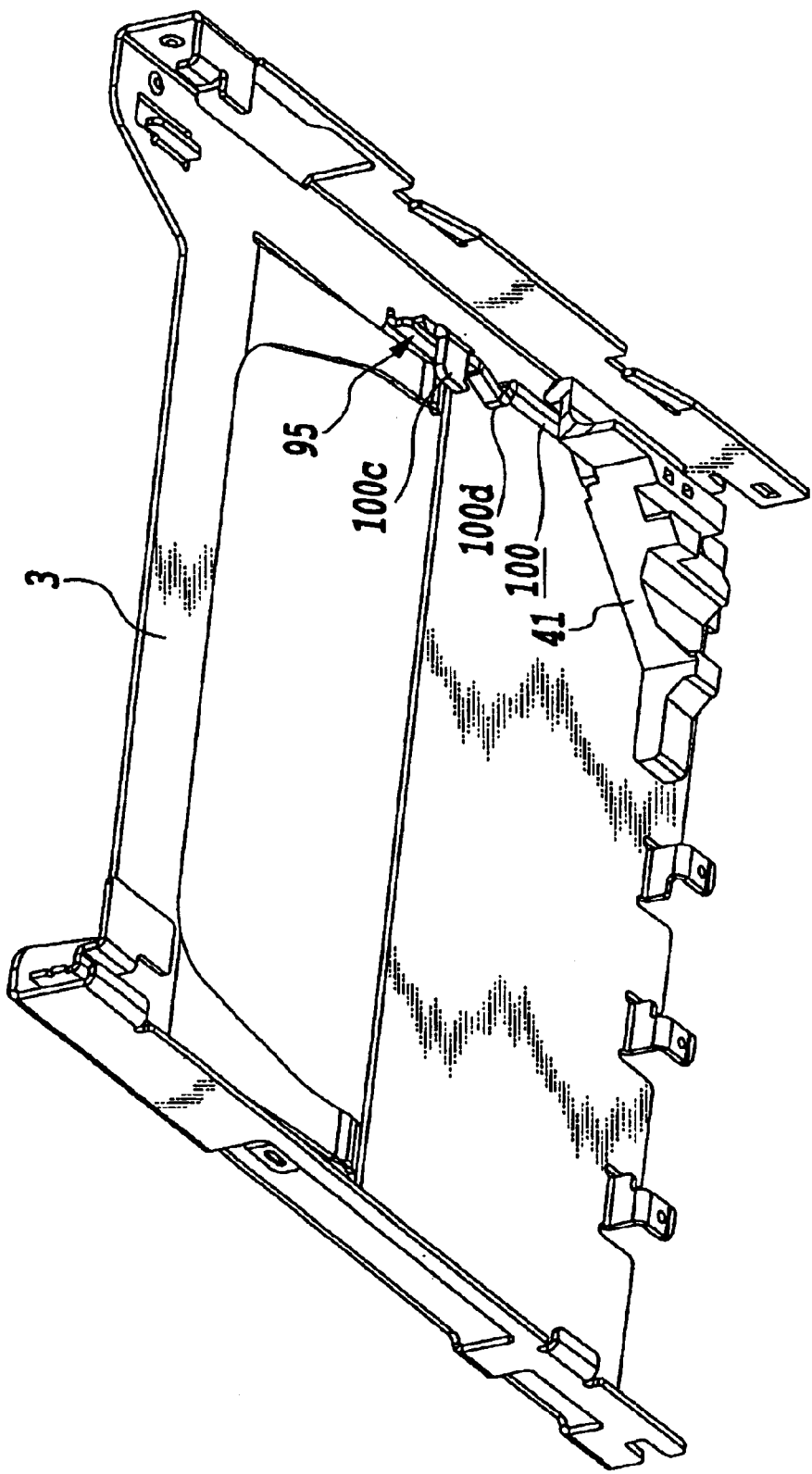
FIG. 34 is a perspective view showing the metal cover and the elastic locking piece of the fourth embodiment in the card-locked state as seen from the underside.
Figure 35:
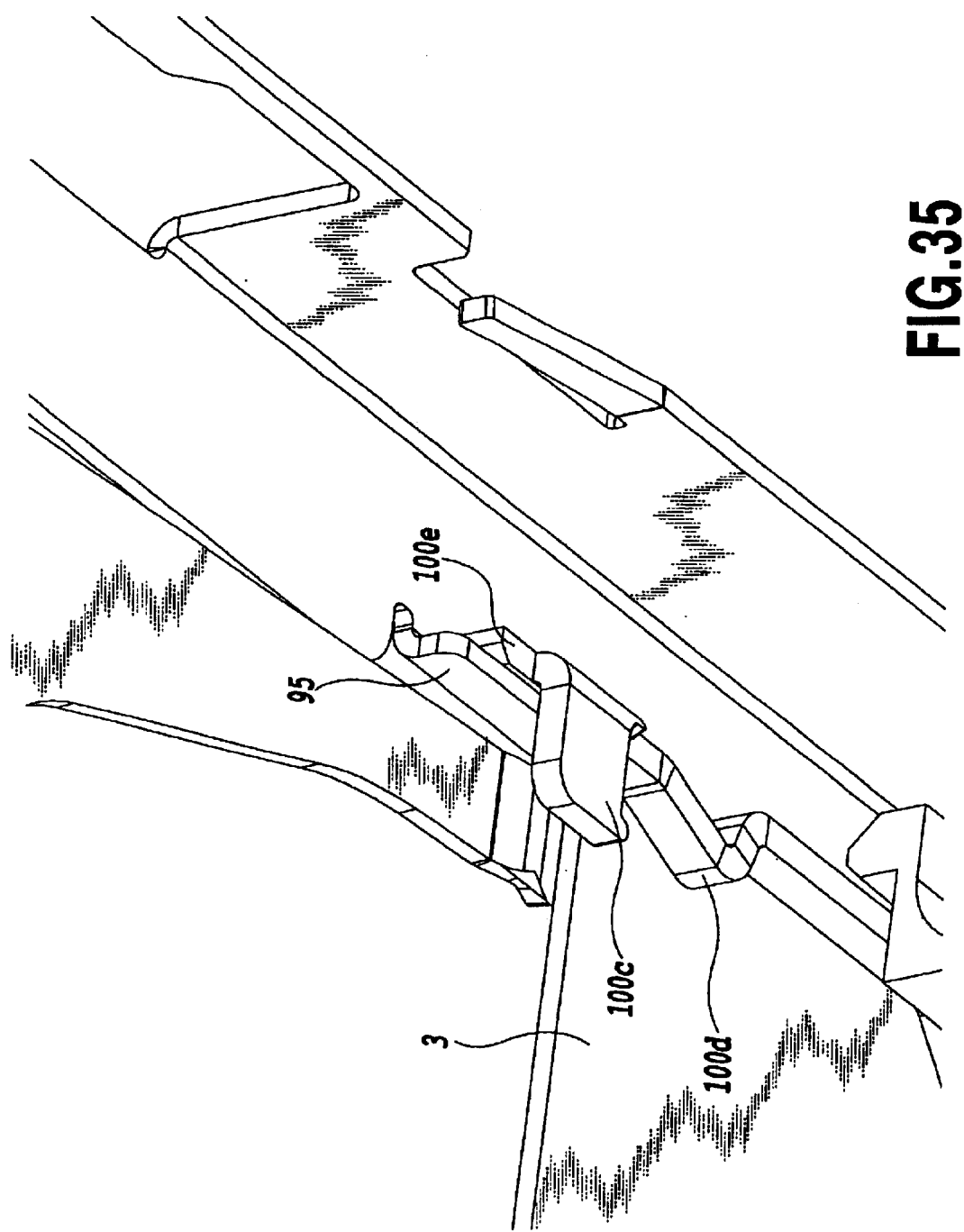
FIG. 35 is an enlarged perspective view showing an essential portion of FIG. 34.
Figure 36:
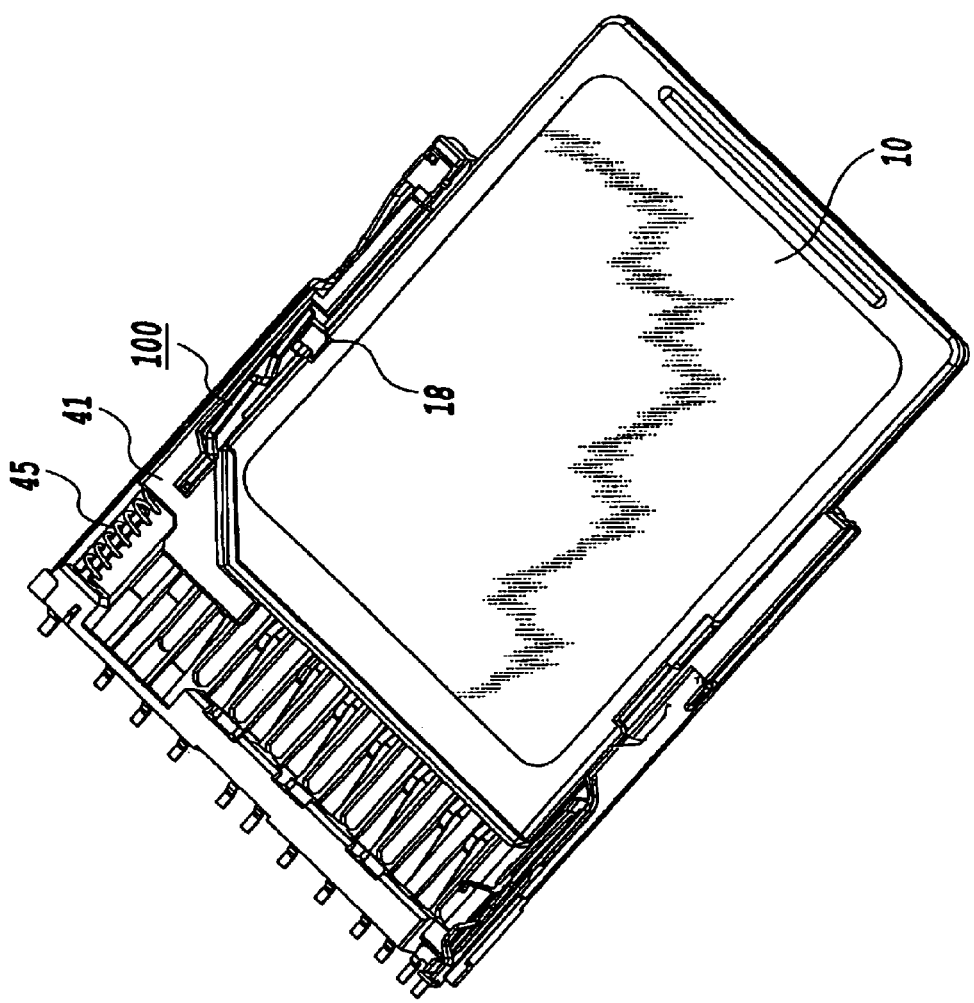
FIG. 36 is a perspective view showing the fourth embodiment in an unlocked state with the metal cover removed.
Figure 37:
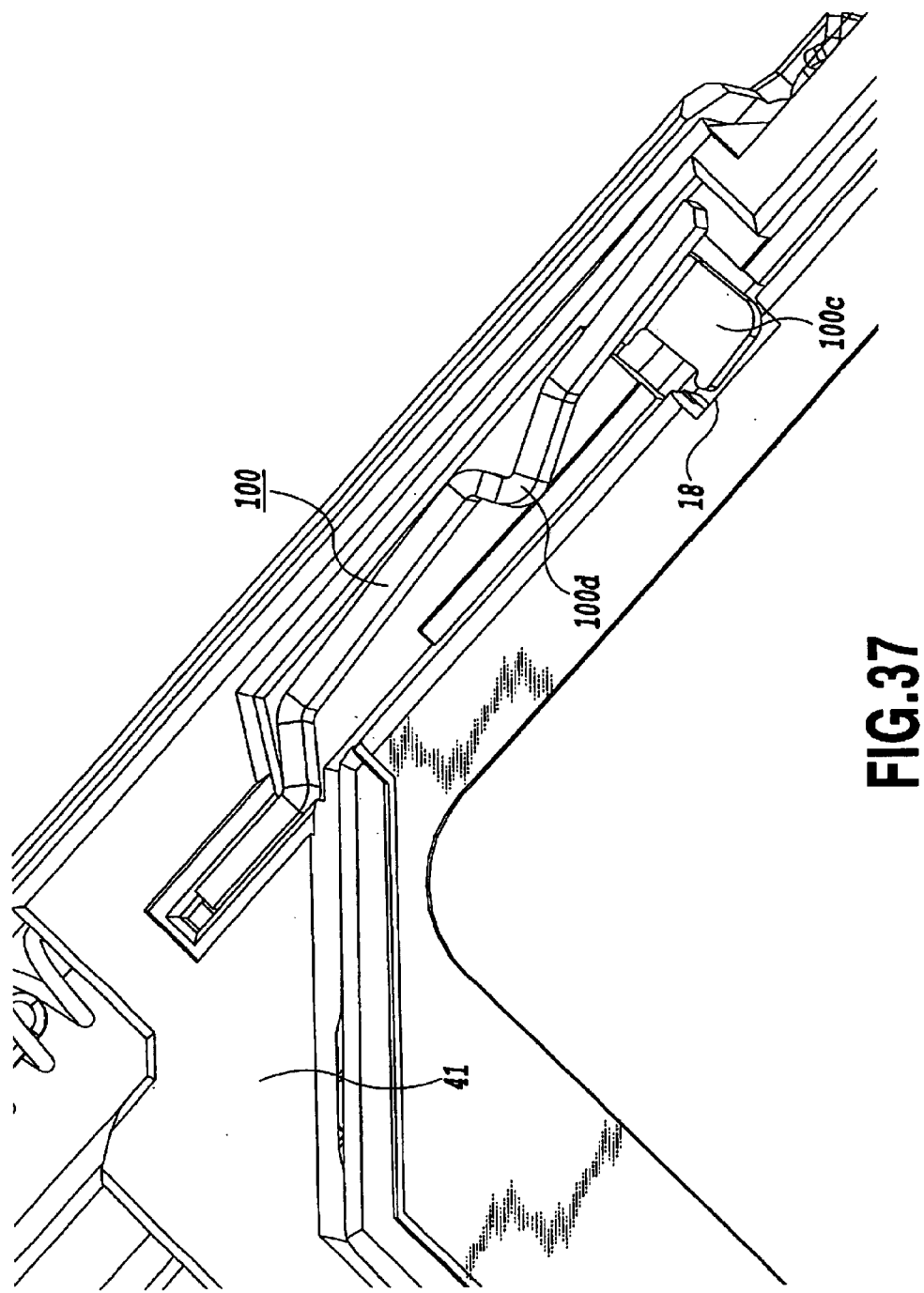
FIG. 37 is an enlarged perspective view showing the card locking portion of the fourth embodiment in the unlocked state.
Figure 38:
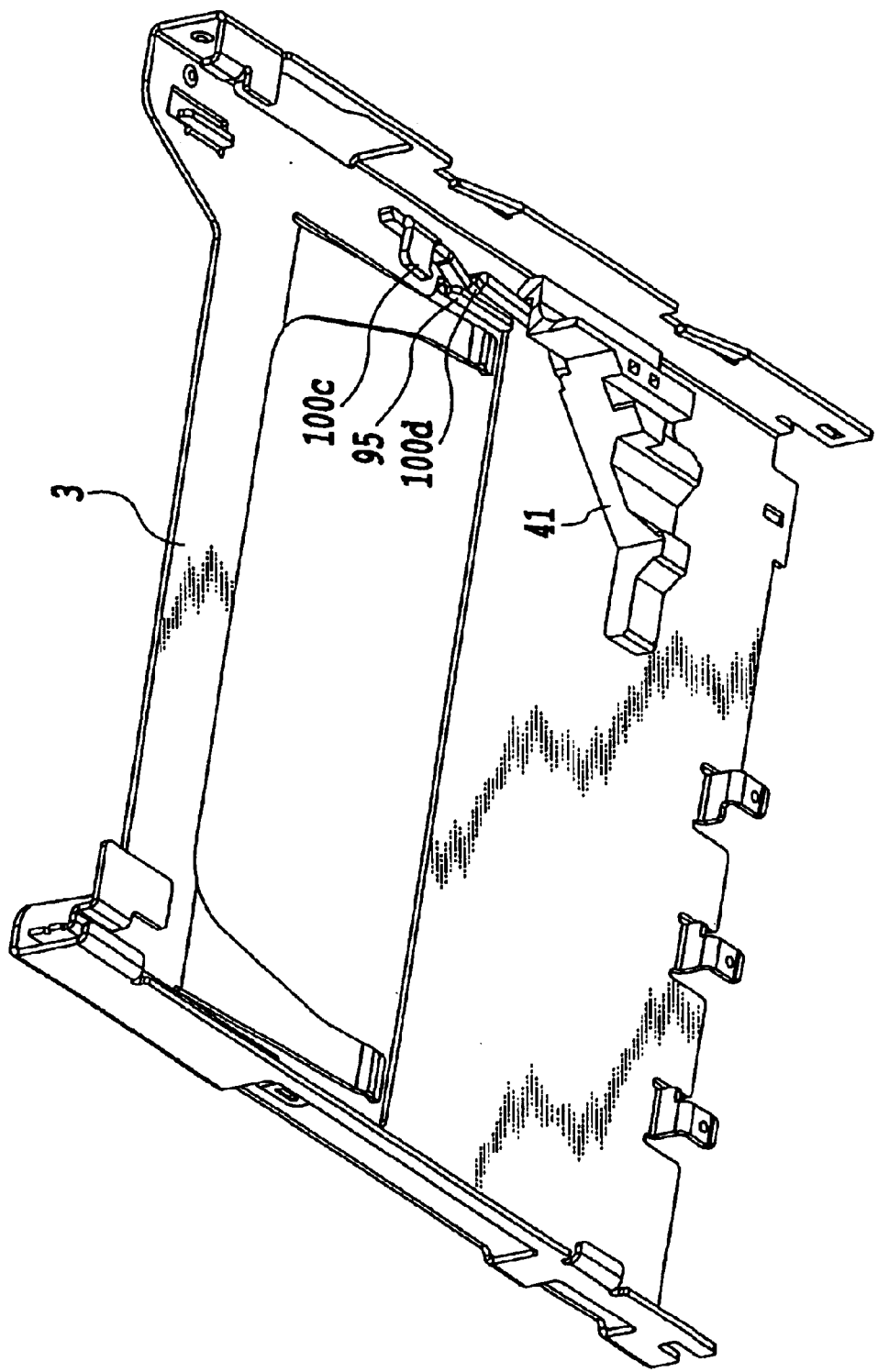
FIG. 38 is a perspective view showing the metal cover and the elastic locking piece of the fourth embodiment in the unlocked state as seen from the underside.
Figure 39:
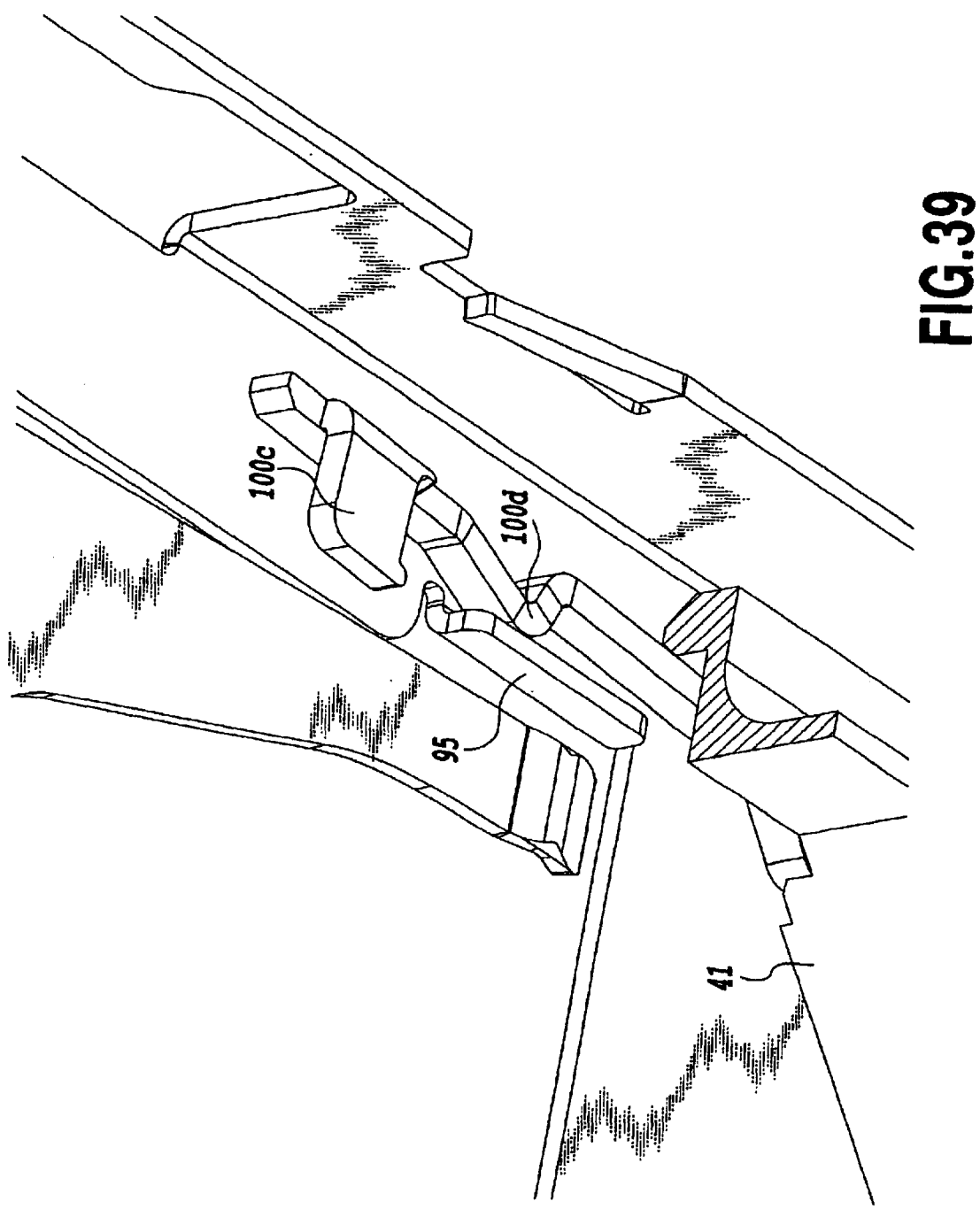
FIG. 39 is an enlarged perspective view showing an essential portion of FIG. 38.

FIG. 30 is an overall perspective view of the fourth embodiment of the card connector. FIG. 31 shows a card-locked state with the metal cover 3 removed. FIG. 32 is an enlarged view showing a card locking portion in the card-locked state. FIG. 33 shows an elastic locking piece secured by press fit to the eject member 41. FIG. 34 shows the metal cover 3 and the elastic locking piece in the card-locked state as seen from the underside. FIG. 35 is an enlarged view of an essential part of FIG. 34. FIG. 36 shows an unlocked state with the metal cover 3 removed. FIG. 37 is an enlarged view of the card locking portion in the unlocked state. FIG. 38 shows the metal cover 3 and the elastic locking piece in the unlocked state as seen from the underside. FIG. 39 is an enlarged view of an essential part of FIG. 38.

As shown in these figures, the fourth embodiment elastically moves the elastic locking piece 100 toward and away from the side surface of the card, as in the first or third embodiment.

The elastic locking piece 100, as in the preceding embodiments, is secured by press fit to the eject member 41 (see FIG. 33) and moves together with it. The eject member 41 is operated in a manner similar to that described earlier by the eject mechanism 40 including the heart cam 43, cam lever 45 and coil spring 46 as shown in FIG. 6.

The elastic locking piece 100, as shown in FIG. 33, has a stationary portion 100a secured to the eject member 41, a spring portion 100b, a locking portion 100c projecting sideways to fit into the recess 18 of the two-stage thickness card 10, and a protruding portion 100d projecting sideways between the spring portion 100b and the locking portion 100c. The protruding portion 100d is brought into engagement with the guide piece 95 projecting from the back surface of the metal cover 3 to elastically displace the locking portion 100c of the elastic locking piece 100 away from the card side surface to disengage the locking portion 100c from the recess 18 of the two-stage thickness card 10.

In the fourth embodiment, as shown in FIG. 34 or FIG. 38, the guide piece 95, similar to the one employed in the third embodiment, is projected from the back surface of the metal cover 3.

In the connector construction described above, when the card is not inserted or it is ejected, the protruding portion 100d of the elastic locking piece 100 engages the guide piece 95 according to the position of the eject member 41, as shown in FIG. 38 and FIG. 39, elastically displacing the spring portion 100b of the elastic locking piece 100. In this state, the locking portion 100c of the elastic locking piece 100 stands by at a position outside the side surface of the two-stage thickness card 10 and thus no load is developed when the card is inserted.

When the two-stage thickness card 10 is inserted, the eject member 41 is pushed by the card 10 toward the far side of the connector 1, as shown in FIGS. 31, 32, 34 and 35. At the same time, the elastic locking piece 100 is also moved to the far side of the connector 1. As a result of this motion, a flat portion 100e of the elastic locking piece 100, which is on a free end side of the protruding portion 100d, comes into contact with the guide piece 95, as shown in FIG. 34 and FIG. 35, releasing the elastic locking piece 100 from the elastic deformation to become virtually free. Hence, the locking portion 100c of the elastic locking piece 100 fits into the recess 18 of the card 10 and is locked there.

As described above, the fourth embodiment brings the locking portion 100c of the elastic locking piece 100 into or out of engagement with the recess 18 of the card 10 by disengaging the protruding portion 100d from or engaging it with the guide piece 95, respectively.

In the fourth embodiment, too, when the one-stage thickness card 20 is inserted, the elastic locking piece 100 works as a braking piece, not as a locking piece, as in the preceding embodiments.

As described above, the fourth embodiment also can reliably lock the two-stage thickness card, preventing it from falling out inadvertently or due to unexpected external force.

In this fourth embodiment, as described above, the elastic locking piece 100 is provided with the protruding portion 100d, a means for bringing the elastic locking piece 100 into or out of engagement with the guide piece 95.

In the fourth embodiment, the elastic locking piece 100 may be displaced vertically, as in the second embodiment. In that case, the protruding portion 100d of the elastic locking piece 100 may be formed to project vertically and the guide piece 95 may be projected from the metal cover 3 so as to come into contact with the vertical protruding portion 100d to displace the elastic locking piece 90 vertically.

Embodiment Variation

In this embodiment, the one-stage thickness card 20 also may be formed with such a recess as is provided in the two-stage thickness card 10 so that it can be locked by the elastic locking piece.

The eject mechanism of FIG. 6 is shown by way of example only and any other eject mechanism of desired construction may be adopted. This invention can also be applied to a card connector that performs the eject operation by an eject button.

The construction for bringing the locking portion of the elastic locking piece into or out of engagement with the card is not limited to those of the previous embodiments but other desired constructions may be used. The only requirement is that during the card ejection, the elastic locking piece is guided to be elastically deformed so that the locking portion of the elastic locking piece moves away from the recess of the card and that during the card insertion, the elastic locking piece is reset from the elastic deformation to engage the locking portion in the recess of the card.

Further, while the above embodiments have used an SD card as an example of the two-stage thickness card 10 and an MMC card as an example of the one-stage thickness card 20, any other kind of card may be employed.

The connector housing applying the present invention may use any other shape and material.

As described above, because the locking portion of the elastic locking piece is forcibly moved toward or away from the card not by the motion of the card itself but by the motion of the ejection member that behaves in the similar manner to the card, the locking portion of the elastic locking piece can adopt a locking structure, such as one shaped like a hook, that can completely block the movement of the card in the retraction direction. This prevents the card from falling out inadvertently or due to unexpected external forces or impacts, thus reliably holding the card at all times during the card insertion.

In the card connector of this invention, when a card without a recess is inserted, the locking portion of the elastic locking piece presses against the wall surface of the card not formed with the recess and works as a braking piece that applies to the card a braking force acting in the direction opposing the card retraction. The card connector of this invention therefore can accept two kinds of cards, one formed with a recess and one not formed with it.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector for accepting a card, which has a recess in its side surface, the card connector comprising:

an eject mechanism having an eject member, the eject member being adapted to move in a card insertion direction as the card is inserted into the connector during a card insertion operation and to move in a card eject direction in response to a card elect operation to eject the card;

an elastic locking piece having a locking portion to engage a single side of the card in the recess of the card and a stationary portion fixed to the eject member; and a locking piece guide means for guiding the elastic locking piece during the card eject operation and the card insertion operation wherein the locking piece guide means causes the elastic locking piece to become elastically deformed during the card eject operation to move the locking portion away from the recess of the card and wherein the locking piece guide means causes the elastic locking piece to become released from the elastic deformation during the card insertion operation thereby causing the elastic locking piece to move toward the card by an elastic recovery force to engage the locking portion in the recess of the card, wherein the locking piece guide means has:
a protruding portion projecting from the elastic locking piece; and
a guide wall formed in the connector housing and having a tapered surface to guide the protruding portion as the eject member moves in the card insertion or eject direction.

2. A card connector according to claim 1, wherein:

the locking piece guide means guides the protruding portion of the elastic locking piece thereby causing the locking portion to move away from the side surface of the card and towards a side wall portion of the connector housing during the card eject operation and to move toward the side surface of the card during the card insertion operation causing the locking portion to press against the side surface of the card;

the protruding portion of the elastic locking piece projects upwardly or downwardly of the connector housing; and the tapered surface of the guide wall is inclined with respect to the side surface of the inserted card.

3. A card connector according to claim 1, wherein:

locking piece guide means guides the protruding portion of the elastic locking piece thereby causing the locking portion to move vertically away from the bottom or top surface of the card during the card eject operation and to move toward the bottom or top surface of the card during the card insertion operation causing the locking portion to press against the bottom or top surface of the card;

the protruding portion of the elastic locking piece projects widthways of the connector housing; and the tapered surface of the guide wall is inclined with respect to the bottom surface of the inserted card.

4. A card connector according to any one of claims 1 to 3, wherein the locking portion of the elastic locking piece is shaped virtually like a hook.

5. A card connector according to any one of claims 1 to 3, wherein the connector housing is formed with a space that prevents the protruding portion from interfering with other members when a second card without the recess is inserted.

6. A card connector for accepting a card and holding it in a connector housing, wherein the card has a recess in its side surface, the card connector comprising:

an eject mechanism including an eject member, a spring member disposed between the eject member and the connector housing and a locking mechanism for locking the eject member, the eject member being adapted to move in a card insertion direction causing an elastic deformation of the spring member as the card is inserted into the connector during a card insertion operation, to be locked by the locking mechanism, and to move in a card eject direction by an elastic recovery force of the spring member in response to a card eject operation to eject the card;

an elastic locking piece, accommodated in a space formed in the eject member, having a locking portion to engage a single side of the card in the recess of the card and a stationary portion fixed to the eject member; and a locking piece guide means, formed in the connector housing, for guiding the elastic locking piece during the card eject operation and the card insertion operation wherein the locking piece guide means causes the elastic locking piece to become elastically deformed during the card eject operation to move the locking portion away from the recess of the card and wherein the locking piece guide means causes the elastic locking piece to become released from the elastic deformation during the card insertion operation thereby causing the elastic locking piece to move toward the card by an elastic recovery force to engage the locking portion in the recess of the card.

* * * * *